(12) United States Patent
Gorgenyi et al.

(10) Patent No.: US 9,820,231 B2
(45) Date of Patent: Nov. 14, 2017

(54) COALESCING GEO-FENCE EVENTS

(71) Applicant: Microsoft Technology LIcensing, LLC, Redmond, WA (US)

(72) Inventors: Frank Gorgenyi, Bremerton, WA (US); Daniel Estrada Alva, Kirkland, WA (US); Fernando Gonzalez, Bellevue, WA (US); Sanjib Saha, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/918,818

(22) Filed: Jun. 14, 2013

(65) Prior Publication Data

US 2014/0370911 A1 Dec. 18, 2014

(51) Int. Cl.
*H04W 52/02* (2009.01)
*H04W 4/02* (2009.01)

(52) U.S. Cl.
CPC ....... *H04W 52/0251* (2013.01); *H04W 4/021* (2013.01); *H04W 4/022* (2013.01)

(58) Field of Classification Search
CPC ..... H04W 4/021; H04W 64/00; H04W 4/022; H04W 52/0251
USPC ............ 455/404.2, 456.1, 456.2, 456.3, 574; 701/426, 434, 438
See application file for complete search history.

(56) References Cited

U.S. PATENT DOCUMENTS

| | | | |
|---|---|---|---|
| 5,379,451 A | 1/1995 | Nakagoshi et al. | |
| 5,883,598 A | 3/1999 | Parl et al. | |
| 6,067,565 A | 5/2000 | Horvitz | |
| 6,078,826 A | 6/2000 | Croft et al. | |
| 6,085,226 A | 7/2000 | Horvitz | |
| 6,182,133 B1 | 1/2001 | Horvitz | |
| 6,243,595 B1 | 6/2001 | Lee et al. | |

(Continued)

FOREIGN PATENT DOCUMENTS

| | | |
|---|---|---|
| CN | 1984402 | 6/2007 |
| CN | 101112072 | 1/2008 |

(Continued)

OTHER PUBLICATIONS

"Final Office Action", U.S. Appl. No. 12/417,752, (Sep. 13, 2012), 18 pages.

(Continued)

*Primary Examiner* — Thai Vu

(57) ABSTRACT

A device location is determined, and the location of an area of interest that is a geographic area referred to as a geo-fence is identified. Multiple geo-fences can be identified by the device, and different geo-fences can be associated with different programs on the device. An operating system of the device implements multiple different periods of operation for the device, including a conservation period during which certain programs are not typically scheduled to run, and an execution period during which such programs are typically scheduled to run. A system identifies geo-fence events, which occur when the device enters or exits the geo-fence. The system maintains a record of the geo-fence events for each of multiple geo-fences, and provides to a program selected ones of those geo-fence events at a time when the program is scheduled to run on the device during an execution period of the operating system.

20 Claims, 6 Drawing Sheets

(56) References Cited

U.S. PATENT DOCUMENTS

| | | | |
|---|---|---|---|
| 6,282,578 B1 * | 8/2001 | Aizono et al. | 719/310 |
| 6,286,001 B1 | 9/2001 | Walker et al. | |
| 6,339,826 B2 | 1/2002 | Hayes et al. | |
| 6,405,033 B1 | 6/2002 | Kennedy et al. | |
| 6,446,069 B1 | 9/2002 | Yaung et al. | |
| 6,504,480 B1 | 1/2003 | Magnuson et al. | |
| 6,513,046 B1 | 1/2003 | Abbott, III et al. | |
| 6,519,530 B2 | 2/2003 | Crockett et al. | |
| 6,546,002 B1 | 4/2003 | Kim | |
| 6,549,768 B1 | 4/2003 | Fraccaroli | |
| 6,564,149 B2 | 5/2003 | Lai | |
| 6,650,189 B1 | 11/2003 | Romao | |
| 6,662,023 B1 | 12/2003 | Helle | |
| 6,678,508 B1 | 1/2004 | Koilpillai et al. | |
| 6,799,047 B1 | 9/2004 | Bahl et al. | |
| 6,847,892 B2 | 1/2005 | Zhou | |
| 6,920,455 B1 | 7/2005 | Weschler | |
| 6,941,134 B2 | 9/2005 | White | |
| 6,968,179 B1 | 11/2005 | De Vries | |
| 6,990,353 B2 | 1/2006 | Florkey et al. | |
| 7,058,659 B2 | 6/2006 | Ryu | |
| 7,076,797 B2 | 7/2006 | Loveland | |
| 7,096,030 B2 | 8/2006 | Huomo | |
| 7,142,848 B2 | 11/2006 | Owen et al. | |
| 7,161,914 B2 | 1/2007 | Shoaib et al. | |
| 7,171,557 B2 | 1/2007 | Kallahalla et al. | |
| 7,200,394 B2 | 4/2007 | Aoki et al. | |
| 7,212,613 B2 | 5/2007 | Kim et al. | |
| 7,222,360 B1 | 5/2007 | Miller | |
| 7,272,388 B2 | 9/2007 | Andrew et al. | |
| 7,274,925 B2 | 9/2007 | Chaar et al. | |
| 7,302,272 B2 | 11/2007 | Ackley | |
| 7,305,284 B2 | 12/2007 | Teshima et al. | |
| 7,308,255 B2 | 12/2007 | Loveland | |
| 7,321,774 B1 | 1/2008 | Lau et al. | |
| 7,346,921 B2 | 3/2008 | Murren et al. | |
| 7,353,234 B2 | 4/2008 | Kimball et al. | |
| 7,359,713 B1 | 4/2008 | Tiwari | |
| 7,366,795 B2 | 4/2008 | O'Neil et al. | |
| 7,366,798 B2 | 4/2008 | Nordstrom et al. | |
| 7,397,908 B2 | 7/2008 | Janssen | |
| 7,408,506 B2 | 8/2008 | Miller | |
| 7,471,929 B2 | 12/2008 | Fujioka et al. | |
| 7,530,099 B2 | 5/2009 | Flurry et al. | |
| 7,561,063 B2 | 7/2009 | Eckhart | |
| 7,565,157 B1 | 7/2009 | Ortega et al. | |
| 7,629,891 B1 | 12/2009 | Bell | |
| 7,634,455 B1 | 12/2009 | Keene et al. | |
| 7,639,131 B2 | 12/2009 | Mock et al. | |
| 7,657,849 B2 | 2/2010 | Chaudhri et al. | |
| 7,668,830 B2 | 2/2010 | Hakala | |
| 7,680,882 B2 | 3/2010 | Tiu, Jr. et al. | |
| 7,714,778 B2 | 5/2010 | Dupray | |
| 7,796,944 B2 | 9/2010 | Eaton et al. | |
| 7,809,350 B2 | 10/2010 | Buckley et al. | |
| 7,818,412 B2 | 10/2010 | Krause et al. | |
| 7,869,792 B1 | 1/2011 | Zhou et al. | |
| 7,898,428 B2 | 3/2011 | Dietz et al. | |
| 7,958,562 B2 | 6/2011 | Gaucas | |
| 7,961,651 B2 | 6/2011 | Kim et al. | |
| 7,962,156 B2 | 6/2011 | Robertson et al. | |
| 8,024,112 B2 | 9/2011 | Krumm et al. | |
| 8,036,677 B2 | 10/2011 | Khan | |
| 8,046,839 B2 | 10/2011 | Lo | |
| 8,112,755 B2 | 2/2012 | Apacible et al. | |
| 8,144,920 B2 | 3/2012 | Kansal et al. | |
| 8,185,599 B2 | 5/2012 | Kansal et al. | |
| 8,228,234 B2 | 7/2012 | Paulson et al. | |
| 8,244,272 B2 | 8/2012 | Morgan et al. | |
| 8,258,748 B2 | 9/2012 | Constien et al. | |
| 8,275,352 B2 | 9/2012 | Forstall et al. | |
| 8,311,730 B2 | 11/2012 | Neff | |
| 8,320,931 B2 | 11/2012 | Ward et al. | |
| 8,331,899 B2 | 12/2012 | Broms | |
| 8,355,751 B2 | 1/2013 | Dietz et al. | |
| 8,385,039 B2 | 2/2013 | Rothkopf | |
| 8,433,334 B2 | 4/2013 | Huang et al. | |
| 8,437,779 B2 | 5/2013 | Phukan | |
| 8,477,139 B2 | 7/2013 | Robinet et al. | |
| 8,549,657 B2 | 10/2013 | Karlson et al. | |
| 8,565,820 B2 | 10/2013 | Riemer et al. | |
| 8,626,136 B2 | 1/2014 | Ozzie et al. | |
| 8,639,803 B2 | 1/2014 | Moritz et al. | |
| 8,657,743 B2 | 2/2014 | Rietzel et al. | |
| 8,660,531 B2 | 2/2014 | Hymel | |
| 8,706,172 B2 | 4/2014 | Priyantha et al. | |
| 8,732,822 B2 | 5/2014 | Schechter et al. | |
| 8,751,582 B1 | 6/2014 | Behforooz et al. | |
| 8,826,013 B1 | 9/2014 | Kodukula et al. | |
| 8,874,162 B2 | 10/2014 | Schrader et al. | |
| 8,907,772 B1 | 12/2014 | Green et al. | |
| 8,918,119 B2 | 12/2014 | Kim et al. | |
| 9,019,077 B2 | 4/2015 | Hazzani | |
| 9,027,117 B2 | 5/2015 | Wilairat et al. | |
| 9,066,234 B2 | 6/2015 | Karlson et al. | |
| 9,189,252 B2 | 11/2015 | Chu et al. | |
| 9,230,076 B2 | 1/2016 | King et al. | |
| 9,420,432 B2 | 8/2016 | Matthews et al. | |
| 9,710,982 B2 | 7/2017 | Dolly et al. | |
| 2001/0005681 A1 | 6/2001 | Kim | |
| 2001/0039587 A1 | 11/2001 | Uhler et al. | |
| 2002/0026478 A1 | 2/2002 | Rodgers | |
| 2002/0044149 A1 | 4/2002 | McCarthy et al. | |
| 2002/0160764 A1 | 10/2002 | Gorsuch | |
| 2002/0183056 A1 * | 12/2002 | Lundblade | G06F 8/61 455/425 |
| 2003/0003907 A1 | 1/2003 | Lai et al. | |
| 2003/0139192 A1 | 7/2003 | Chmaytelli et al. | |
| 2003/0154293 A1 | 8/2003 | Zmolek | |
| 2003/0187803 A1 | 10/2003 | Pitt | |
| 2004/0007916 A1 | 1/2004 | Awada et al. | |
| 2004/0015940 A1 | 1/2004 | Heisey et al. | |
| 2004/0039909 A1 | 2/2004 | Cheng | |
| 2004/0166878 A1 | 8/2004 | Erskine et al. | |
| 2004/0192352 A1 | 9/2004 | Vallstrom et al. | |
| 2004/0193813 A1 | 9/2004 | Nguyen et al. | |
| 2004/0203576 A1 | 10/2004 | Droste et al. | |
| 2004/0243812 A1 | 12/2004 | Yui et al. | |
| 2005/0012640 A1 | 1/2005 | Kong et al. | |
| 2005/0037775 A1 | 2/2005 | Moeglein et al. | |
| 2005/0055567 A1 | 3/2005 | Libin et al. | |
| 2005/0059418 A1 | 3/2005 | Northcutt | |
| 2005/0070276 A1 | 3/2005 | McGarry | |
| 2005/0107114 A1 | 5/2005 | Ocock et al. | |
| 2005/0138110 A1 | 6/2005 | Redlich et al. | |
| 2005/0143171 A1 | 6/2005 | Loose | |
| 2005/0210104 A1 | 9/2005 | Torvinen | |
| 2005/0222768 A1 | 10/2005 | Tauchi et al. | |
| 2006/0046706 A1 | 3/2006 | Lin et al. | |
| 2006/0053389 A1 | 3/2006 | Michelman | |
| 2006/0099969 A1 | 5/2006 | Staton et al. | |
| 2006/0136998 A1 | 6/2006 | Oowaki et al. | |
| 2006/0155664 A1 | 7/2006 | Morikawa et al. | |
| 2006/0183486 A1 | 8/2006 | Mullen | |
| 2006/0246872 A1 | 11/2006 | Tarkkala | |
| 2006/0253570 A1 | 11/2006 | Biswas et al. | |
| 2006/0256005 A1 | 11/2006 | Thandu et al. | |
| 2006/0271797 A1 | 11/2006 | Ginggen et al. | |
| 2006/0277271 A1 | 12/2006 | Morse et al. | |
| 2006/0293057 A1 | 12/2006 | Mazerski et al. | |
| 2007/0028176 A1 | 2/2007 | Perdomo et al. | |
| 2007/0032225 A1 | 2/2007 | Konicek et al. | |
| 2007/0042790 A1 | 2/2007 | Mohi et al. | |
| 2007/0046423 A1 | 3/2007 | Baucom | |
| 2007/0046456 A1 | 3/2007 | Edwards et al. | |
| 2007/0049290 A1 | 3/2007 | Mullen | |
| 2007/0064882 A1 | 3/2007 | Ger et al. | |
| 2007/0067655 A1 | 3/2007 | Shuster | |
| 2007/0072616 A1 | 3/2007 | Irani | |
| 2007/0073832 A1 | 3/2007 | Curtis et al. | |
| 2007/0082707 A1 | 4/2007 | Flynt et al. | |
| 2007/0091037 A1 | 4/2007 | Lee | |
| 2007/0111726 A1 | 5/2007 | Lambert et al. | |
| 2007/0150826 A1 | 6/2007 | Anzures et al. | |

(56) References Cited

U.S. PATENT DOCUMENTS

| | | |
|---|---|---|
| 2007/0150842 A1 | 6/2007 | Chaudhri et al. |
| 2007/0168971 A1 | 7/2007 | Royzen et al. |
| 2007/0180509 A1 | 8/2007 | Swartz et al. |
| 2007/0218938 A1 | 9/2007 | Carter |
| 2007/0245398 A1 | 10/2007 | Roden |
| 2007/0264981 A1 | 11/2007 | Miller |
| 2007/0275767 A1 | 11/2007 | Steele |
| 2007/0281689 A1 | 12/2007 | Altman et al. |
| 2007/0300140 A1 | 12/2007 | Makela et al. |
| 2008/0005695 A1 | 1/2008 | Ozzie et al. |
| 2008/0014964 A1 | 1/2008 | Sudit et al. |
| 2008/0020803 A1 | 1/2008 | Rios et al. |
| 2008/0032703 A1 | 2/2008 | Krumm et al. |
| 2008/0045232 A1 | 2/2008 | Cone |
| 2008/0051079 A1 | 2/2008 | Forsgren |
| 2008/0070593 A1 | 3/2008 | Altman et al. |
| 2008/0080688 A1 | 4/2008 | Burgan et al. |
| 2008/0082693 A1 | 4/2008 | Meijer et al. |
| 2008/0096518 A1 | 4/2008 | Mock et al. |
| 2008/0096519 A1 | 4/2008 | Miegel |
| 2008/0101658 A1 | 5/2008 | Ahern et al. |
| 2008/0104225 A1 | 5/2008 | Zhang et al. |
| 2008/0111698 A1 | 5/2008 | Atherton |
| 2008/0126441 A1 | 5/2008 | Giampaolo et al. |
| 2008/0132252 A1 | 6/2008 | Altman et al. |
| 2008/0133708 A1 | 6/2008 | Alvarado et al. |
| 2008/0140650 A1 | 6/2008 | Stackpole |
| 2008/0154780 A1 | 6/2008 | Soukup et al. |
| 2008/0184127 A1 | 7/2008 | Rafey et al. |
| 2008/0227473 A1 | 9/2008 | Haney |
| 2008/0244005 A1 | 10/2008 | Sengupta et al. |
| 2008/0249969 A1 | 10/2008 | Tsui et al. |
| 2008/0254767 A1 | 10/2008 | Jin |
| 2008/0256170 A1 | 10/2008 | Hayashi et al. |
| 2008/0268870 A1 | 10/2008 | Houri |
| 2008/0305808 A1 | 12/2008 | Chan et al. |
| 2008/0311947 A1 | 12/2008 | Soerensen et al. |
| 2008/0318595 A1 | 12/2008 | Rofougaran |
| 2008/0320087 A1 | 12/2008 | Horvitz et al. |
| 2009/0005061 A1 | 1/2009 | Ward et al. |
| 2009/0005080 A1 | 1/2009 | Forstall et al. |
| 2009/0006566 A1 | 1/2009 | Veeramachaneni et al. |
| 2009/0006991 A1 | 1/2009 | Lindberg et al. |
| 2009/0036102 A1 | 2/2009 | Ho |
| 2009/0045927 A1 | 2/2009 | Atella |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0125918 A1 | 5/2009 | Kansal et al. |
| 2009/0143082 A1 | 6/2009 | Begeja et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0197617 A1 | 8/2009 | Jayanthi |
| 2009/0201896 A1 | 8/2009 | Davis et al. |
| 2009/0205041 A1 | 8/2009 | Michalske |
| 2009/0224867 A1 | 9/2009 | O'Shaughnessy et al. |
| 2009/0224931 A1 | 9/2009 | Dietz et al. |
| 2009/0224941 A1 | 9/2009 | Kansal et al. |
| 2009/0265794 A1 | 10/2009 | Apelqvist |
| 2009/0270034 A1 | 10/2009 | Suzuki |
| 2009/0278738 A1 | 11/2009 | Gopinath |
| 2009/0282473 A1 | 11/2009 | Karlson et al. |
| 2009/0298475 A1 | 12/2009 | Czaja et al. |
| 2009/0300525 A1 | 12/2009 | Jolliff et al. |
| 2010/0001967 A1 | 1/2010 | Yoo |
| 2010/0004005 A1 | 1/2010 | Pereira et al. |
| 2010/0010733 A1 | 1/2010 | Krumm |
| 2010/0020035 A1 | 1/2010 | Ryu et al. |
| 2010/0045519 A1 | 2/2010 | Lee |
| 2010/0056124 A1 | 3/2010 | Keating et al. |
| 2010/0066821 A1 | 3/2010 | Rosener et al. |
| 2010/0069007 A1 | 3/2010 | Nagasawa |
| 2010/0070334 A1 | 3/2010 | Monteverde |
| 2010/0074450 A1 | 3/2010 | Liao |
| 2010/0082247 A1 | 4/2010 | Klein et al. |
| 2010/0090852 A1 | 4/2010 | Eitan et al. |
| 2010/0112955 A1 | 5/2010 | Krishnaswamy et al. |
| 2010/0115610 A1 | 5/2010 | Tredoux et al. |
| 2010/0127836 A1 | 5/2010 | Huang et al. |
| 2010/0127919 A1 | 5/2010 | Curran et al. |
| 2010/0130229 A1 | 5/2010 | Sridhara et al. |
| 2010/0134310 A1 | 6/2010 | Zheng et al. |
| 2010/0162180 A1 | 6/2010 | Dunnam et al. |
| 2010/0167714 A1 | 7/2010 | Howarter et al. |
| 2010/0190479 A1 | 7/2010 | Scott et al. |
| 2010/0210301 A1 | 8/2010 | Dietz et al. |
| 2010/0216509 A1 | 8/2010 | Riemer et al. |
| 2010/0217646 A1 | 8/2010 | Siegel |
| 2010/0227588 A1 | 9/2010 | Bradley |
| 2010/0231383 A1 | 9/2010 | Levine et al. |
| 2010/0235881 A1 | 9/2010 | Liu et al. |
| 2010/0253503 A1 | 10/2010 | Juang |
| 2010/0255856 A1 | 10/2010 | Kansal et al. |
| 2010/0268779 A1 | 10/2010 | Rao |
| 2010/0285815 A1 | 11/2010 | Treu et al. |
| 2010/0291950 A1 | 11/2010 | Lin et al. |
| 2010/0302028 A1 | 12/2010 | Desai et al. |
| 2010/0306705 A1 | 12/2010 | Nilsson |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0323715 A1 | 12/2010 | Winters |
| 2010/0324819 A1 | 12/2010 | Nurminen et al. |
| 2010/0325194 A1 | 12/2010 | Williamson et al. |
| 2011/0010340 A1 | 1/2011 | Hung et al. |
| 2011/0014933 A1 | 1/2011 | Karmarkar et al. |
| 2011/0021213 A1 | 1/2011 | Carr |
| 2011/0021234 A1 | 1/2011 | Tibbitts et al. |
| 2011/0028138 A1 | 2/2011 | Davies-Moore et al. |
| 2011/0047484 A1 | 2/2011 | Mount et al. |
| 2011/0063098 A1 | 3/2011 | Fischer et al. |
| 2011/0063138 A1 | 3/2011 | Berkobin et al. |
| 2011/0065419 A1 | 3/2011 | Book et al. |
| 2011/0068923 A1 | 3/2011 | Burket et al. |
| 2011/0070829 A1 | 3/2011 | Griffin et al. |
| 2011/0078758 A1 | 3/2011 | Kohlenberg et al. |
| 2011/0093161 A1 | 4/2011 | Zhou et al. |
| 2011/0111728 A1 | 5/2011 | Ferguson et al. |
| 2011/0111772 A1 | 5/2011 | Tysowski |
| 2011/0140956 A1 | 6/2011 | Henry et al. |
| 2011/0151839 A1 | 6/2011 | Bolon et al. |
| 2011/0151890 A1 | 6/2011 | Platt et al. |
| 2011/0167342 A1 | 7/2011 | De La Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0208430 A1 | 8/2011 | Tun et al. |
| 2011/0211511 A1 | 9/2011 | Bakthavathsalu et al. |
| 2011/0215903 A1 | 9/2011 | Yang et al. |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1 | 10/2011 | Lee et al. |
| 2011/0254792 A1 | 10/2011 | Waters et al. |
| 2011/0264246 A1 | 10/2011 | Pantoja et al. |
| 2011/0267171 A1 | 11/2011 | Li et al. |
| 2011/0275321 A1 | 11/2011 | Zhou et al. |
| 2011/0276901 A1 | 11/2011 | Zambetti |
| 2011/0282571 A1 | 11/2011 | Krumm et al. |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0294520 A1 | 12/2011 | Zhou et al. |
| 2011/0299422 A1 | 12/2011 | Kim et al. |
| 2011/0307166 A1 | 12/2011 | Hiestermann et al. |
| 2011/0319051 A1 | 12/2011 | Reitnour |
| 2011/0319094 A1 | 12/2011 | Usui et al. |
| 2011/0320518 A1 | 12/2011 | Tsui et al. |

(56) References Cited

U.S. PATENT DOCUMENTS

| | | |
|---|---|---|
| 2012/0008226 A1 | 1/2012 | Boutaghou |
| 2012/0023573 A1 | 1/2012 | *Shi |
| 2012/0046020 A1 | 2/2012 | Tomasini |
| 2012/0046040 A1* | 2/2012 | Chatterjee ................. 455/456.1 |
| 2012/0084691 A1 | 4/2012 | Yun |
| 2012/0084734 A1 | 4/2012 | Wilairat |
| 2012/0084737 A1 | 4/2012 | Gimpl et al. |
| 2012/0089217 A1 | 4/2012 | Mews et al. |
| 2012/0098768 A1 | 4/2012 | Bendewald et al. |
| 2012/0100895 A1 | 4/2012 | Priyantha et al. |
| 2012/0115512 A1* | 5/2012 | Grainger et al. .......... 455/456.3 |
| 2012/0136689 A1 | 5/2012 | Ickman et al. |
| 2012/0144468 A1 | 6/2012 | Pratt et al. |
| 2012/0146850 A1 | 6/2012 | Liu |
| 2012/0158289 A1 | 6/2012 | Brush et al. |
| 2012/0166452 A1 | 6/2012 | Tseng |
| 2012/0166548 A1 | 6/2012 | Gropper |
| 2012/0172027 A1 | 7/2012 | Partheesh et al. |
| 2012/0234058 A1 | 9/2012 | Neil et al. |
| 2012/0242470 A1 | 9/2012 | Morgan et al. |
| 2012/0242906 A1 | 9/2012 | Shintani et al. |
| 2012/0244883 A1 | 9/2012 | Tibbitts et al. |
| 2012/0245838 A1 | 9/2012 | Van Doorselaer |
| 2012/0252418 A1 | 10/2012 | Kandekar et al. |
| 2012/0268249 A1 | 10/2012 | Kansal |
| 2012/0282887 A1 | 11/2012 | Khoo et al. |
| 2012/0284256 A1 | 11/2012 | Mahajan et al. |
| 2012/0284297 A1 | 11/2012 | Aguera-Arcas et al. |
| 2012/0284769 A1 | 11/2012 | Dixon et al. |
| 2012/0289217 A1 | 11/2012 | Riemer et al. |
| 2012/0289244 A1 | 11/2012 | Goyal |
| 2012/0295645 A1 | 11/2012 | Yariv et al. |
| 2012/0302256 A1 | 11/2012 | Pai et al. |
| 2012/0302258 A1 | 11/2012 | Pai et al. |
| 2012/0306637 A1 | 12/2012 | McGough et al. |
| 2012/0306699 A1 | 12/2012 | Schlesinger et al. |
| 2012/0309413 A1 | 12/2012 | Grosman et al. |
| 2012/0311499 A1 | 12/2012 | Dellinger et al. |
| 2012/0317162 A1 | 12/2012 | Endsley et al. |
| 2013/0006469 A1 | 1/2013 | Green et al. |
| 2013/0006522 A1 | 1/2013 | Vellaikal et al. |
| 2013/0018581 A1 | 1/2013 | Sidhu |
| 2013/0023246 A9 | 1/2013 | Ellingham et al. |
| 2013/0031169 A1 | 1/2013 | Axelrod et al. |
| 2013/0031601 A1 | 1/2013 | Bott |
| 2013/0036211 A1 | 2/2013 | Messer et al. |
| 2013/0040629 A1 | 2/2013 | Sprigg et al. |
| 2013/0040654 A1 | 2/2013 | Parish |
| 2013/0040711 A1 | 2/2013 | Kim et al. |
| 2013/0045760 A1 | 2/2013 | Obermeyer et al. |
| 2013/0055348 A1 | 2/2013 | Strauss et al. |
| 2013/0065613 A1 | 3/2013 | Stopel et al. |
| 2013/0072172 A1 | 3/2013 | Chang et al. |
| 2013/0072226 A1 | 3/2013 | Thramann |
| 2013/0084847 A1 | 4/2013 | Tibbitts et al. |
| 2013/0085861 A1 | 4/2013 | Dunlap |
| 2013/0093707 A1 | 4/2013 | Park et al. |
| 2013/0099977 A1 | 4/2013 | Sheshadri et al. |
| 2013/0130742 A1 | 5/2013 | Dietz et al. |
| 2013/0138334 A1 | 5/2013 | Meredith et al. |
| 2013/0158867 A1 | 6/2013 | Sidhu et al. |
| 2013/0173513 A1 | 7/2013 | Chu et al. |
| 2013/0188503 A1 | 7/2013 | Anepu et al. |
| 2013/0217416 A1 | 8/2013 | Matthews, III |
| 2013/0225151 A1 | 8/2013 | King |
| 2013/0225152 A1 | 8/2013 | Matthews, III |
| 2013/0227431 A1 | 8/2013 | Vasudevan |
| 2013/0232552 A1 | 9/2013 | Brush et al. |
| 2013/0295872 A1 | 11/2013 | Guday et al. |
| 2013/0295913 A1 | 11/2013 | Matthews, III et al. |
| 2013/0295970 A1 | 11/2013 | Sheshadri et al. |
| 2013/0298037 A1 | 11/2013 | Matthews |
| 2013/0303143 A1 | 11/2013 | Schrader |
| 2013/0305354 A1 | 11/2013 | King et al. |
| 2014/0024354 A1 | 1/2014 | Haik et al. |
| 2014/0068755 A1 | 3/2014 | King et al. |
| 2014/0167961 A1* | 6/2014 | Finlow-Bates ............... 340/541 |
| 2014/0213295 A1 | 7/2014 | Conklin |
| 2014/0278054 A1 | 9/2014 | Tidd et al. |
| 2014/0370909 A1 | 12/2014 | Natucci, Jr. et al. |
| 2014/0370910 A1 | 12/2014 | Natucci, Jr. et al. |
| 2015/0011203 A1 | 1/2015 | Schrader |
| 2015/0213252 A1 | 7/2015 | Wilairat |
| 2015/0220712 A1 | 8/2015 | King et al. |
| 2015/0286840 A1 | 10/2015 | Karlson et al. |
| 2016/0007151 A1* | 1/2016 | Birch .................. H04W 4/021 455/456.3 |
| 2016/0197968 A1 | 7/2016 | Vasudevan et al. |
| 2016/0248906 A1 | 8/2016 | Schrader et al. |
| 2016/0328902 A1 | 11/2016 | Matthews et al. |

FOREIGN PATENT DOCUMENTS

| | | |
|---|---|---|
| CN | 101251589 | 8/2008 |
| CN | 101617304 | 12/2009 |
| CN | 101778165 | 7/2010 |
| CN | 101828162 | 9/2010 |
| CN | 102006550 | 4/2011 |
| CN | 102204374 | 4/2011 |
| EP | 2169946 | 3/2010 |
| EP | 2293016 | 3/2011 |
| EP | 2369864 | 9/2011 |
| EP | 2451139 | 5/2012 |
| EP | 2469442 | 6/2012 |
| JP | 07203015 | 8/1995 |
| JP | 2002142010 | 5/2002 |
| JP | 2002530783 | 9/2002 |
| JP | 2003032353 | 1/2003 |
| JP | 2004152276 | 5/2004 |
| JP | 2005043355 | 2/2005 |
| JP | 3669702 | 7/2005 |
| JP | 2007257140 | 10/2007 |
| JP | 2009521753 | 6/2009 |
| JP | 2009171160 | 7/2009 |
| JP | 2010503082 | 1/2010 |
| JP | 2010518416 | 5/2010 |
| JP | 2010286924 | 12/2010 |
| JP | 2012505481 | 3/2012 |
| JP | 2012247366 | 12/2012 |
| KR | 20050037613 | 4/2005 |
| KR | 20100083396 | 7/2010 |
| KR | 20110119283 | 2/2011 |
| KR | 20110093528 | 8/2011 |
| RU | 2354990 | 5/2009 |
| RU | 2448429 | 4/2012 |
| RU | 2478987 | 4/2013 |
| WO | WO-2005031544 | 4/2005 |
| WO | WO-2006054858 | 5/2006 |
| WO | WO-2006088273 | 8/2006 |
| WO | WO-2006099535 | 9/2006 |
| WO | WO-2007130123 | 11/2007 |
| WO | WO-2009016505 | 2/2009 |
| WO | WO-2009105666 | 8/2009 |
| WO | WO-2009152472 | 12/2009 |
| WO | WO 2010103584 | 9/2010 |
| WO | WO-2011035390 | 3/2011 |
| WO | WO-2011135359 | 11/2011 |
| WO | WO-2012047412 | 4/2012 |
| WO | WO-2012096603 | 7/2012 |
| WO | WO-2013056145 | 4/2013 |
| WO | WO-2013061156 | 5/2013 |

OTHER PUBLICATIONS

"Final Office Action", U.S. Appl. No. 12/912,456, (Jan. 9, 2013), 21 pages.

"Flextrack Lommy Phoenix platforms Technical Description Draft", Retrieved from <http://tayeb.fr/wiki_uploads/balise/FlextrackPhoenix_GT.pdf> on Apr. 15, 2013, pp. 1-36.

"Geo-fencing: Does geo-fencing in iOS 6 Poll your Location Multiple Times a Day?", Retrieved from <http://www.quora.com/Geo-fencing/Does-geo-fencing-in-iOS-6-poll-your-location-multiple-times-a-day> on Apr. 12, 2013, 2 pages.

(56) References Cited

OTHER PUBLICATIONS

"Ignite Where & Launch Pad", O'Reilly, Where 2.0 Conference 2008, retrieved from <http://en.oreilly.com/where2008/public/schedule/detail/2572> on Feb. 5, 2009,(May 2008), 4 pages.
"Non Final Office Action", U.S. Appl. No. 12/417,752, (Jun. 28, 2011), 14 pages.
"Non-Final Office Action", U.S. Appl. No. 12/417,752, (May 24, 2013), 17 pages.
"Non-Final Office Action", U.S. Appl. No. 12/912,456, (May 4, 2012), 14 pages.
"Non-Final Office Action", U.S. Appl. No. 12/912,456, (Sep. 11, 2012), 15 pages.
"Non-Final Office Action", U.S. Appl. No. 13/090,474, (Apr. 26, 2013), 11 pages.
"PCT Search Report and Written Opinion", Application No. PCT/US2012/034598, (Oct. 12, 2012), 9 pages.
"PCT Search Report and Written Opinion", Application No. PCT/US2012/071562, (Apr. 24, 2013), 9 pages.
"To Create a Geo-fencing Policy for iOS Devices", Retrieved from <http://support.citrix.com/proddocs/topic/xmob-dm-8/xm-dm-manage-geofence-ios-tsk.html> on Apr. 12, 2013, (Feb. 8, 2013), 1 page.
"U.S. Application as Filed", U.S. Appl. No. 13/409,905, (Mar. 1, 2012), 44 pages.
"VIMOCOS—Vienna Mobile Context Sharing", Retrieved on Jan 2, 2012 from <<http://www.infosys.tuwien.ac.at/prototypes/VIMOCOS/VIMOCOS_index.html>>, 2 Pages.
"What's An Android? and Other Smart(phone) Questions", Retrieved from: <http://bestbuybusinessdistrict.com/knowlege-center/58-what%27s-an-android-and-other-smart-phone-questions> on Feb. 7, 2011, (Sep. 6, 2010), 4 pages.
Aalto, Lauri et al., "Bluetooth and WAP Push Based Location-Aware Mobile Advertising System", *ACM, MobiSYS '04*, Jun. 6-9, 2004, Boston, MA, retrieved from <http://www.mediateam.oulu.fi/publications/pdf/496.pdf> on Feb. 5, 2009, (Jun. 6, 2004), 10 pages.
Abdelzaher, et al., "Mobiscopes for Human Spaces", *IEEE Pervasive Computing*, vol. 6, No. 2, (Apr. 2007), 11 pages.
Abdesslem, et al., "Less is More: Energy-Efficient Mobile Sensing with SenseLess", *MobiHeld An ACM SIGCOMM workshop*, (Aug. 17, 2009), pp. 61-62.
Agarwal, Yuvraj et al., "Somniloquy: Augmenting Network Interfaces to Reduce PC Energy Usage", *Symposium on Networked Systems Design and Implementation (NSDI)*, 2009, available at <http://www.usenix.org/events/nsdi09/tech/full_papers/agarwal/agarwal.pdf>,(Apr. 23, 2009), pp. 365-380.
Aleksy, Markus et al., "Techniques for Efficient Resource Management for Context-Sensitive Mobile Applications", *International Conference on Complex Intelligent and Software Intensive Systems (CISIS)*, Retrieved at >>http://ieeexplore.ieee.org/stamp/stamp.jsp?tp=&arnumber=4606684>>,(Mar. 4, 2008), 6 Pages.
Azizyan, Martin et al., "SurroundSense: Mobile Phone Localization Using Ambient Sound and Light", retrieved from <http://synrg.ee.duke.edu/papers/surroundsense-poster.pdf> on Feb. 5, 2009,(Sep. 22, 208), 1 page.
Bahl, Paramvir et al., "RADAR: An In-Building RF-based User Location and Tracking System", *Microsoft Research, Proceedings of IEEE Infocom 2000*, Tel-Aviv, Israel, retrieved from <https://3research.microsoft.com/en-us/um/people/padmanab/papers/infocom2000.pdf> on Feb. 5, 2009,(Mar. 2000), 10 pages.
Balakrishnan, Hari et al., "ITR: Scalable Location-Aware Monitoring (SLAM) Systems", *Laboratory for Computer Science & Department of EECS, MIT, Cambridge, MA*, retrieved from <http://nms.lcs.mit.edu/projects/slam/prop.pdf> on Feb. 5, 2009,(Nov. 9, 2001), 31 pages.
Balasubramanian, Niranjan et al., "Energy Consumption in Mobile Phones: A Measurement Study and Implications for Network Applications", *Proceedings of the 9th ACM SIGCOMM conference on Internet measurement conference (IMC)*, Retrieved at <<http://www.cs.umass.edu/-arunab/paper/tailender-imc09.pdf>>,(Nov. 4, 2009), 14 Pages.

Barroso, et al., "The Case for Energy-Proportional Computing", *IEEE Computer Society*, vol. 40. No. 12, (Dec. 2007), pp. 33-37.
Burke, et al., "Participatory Sensing", *WSW at SenSys*, (Oct. 31, 2006), 5 pages.
Campbell, Mikey "Apple Brings Customizable Geofencing to Find My Friends in Update", Retrieved from <http://appleinsider.com/articles/13/03/28/apple-brings-customizable-geofencing-notifications-in-find-my-friends-update> on May 1, 2013, (Mar. 28, 2013), 5 pages.
Chiu, et al., "Playful Bottle: A Mobile Social Persuasion System to Motivate Healthy Water Intake", *Proceedings of the 11th international conference on Ubiquitous computing*, (2009), 10 pages.
Chu, David et al., "U.S. Application as Filed", U.S. Appl. No. 13/340,702, (Dec. 30, 2011), 60 pages.
Consolvo, "Flowers or a Robot Army?: Encouraging Awareness & Activity with Personal, Mobile Displays", *Proceedings of the 10th International Conference on Ubiquitous Computing*, vol. 12, No. 4, Publisher: ACM Press, (Sep. 2008), 10 pages.
Constandache, et al., "Energy-Aware Localization Using Mobile Phones", retrieved from <http://www.cs.duke.edu/~ionut/2008_mobisys.pdf> on Feb. 5, 2009,(Jun. 2008), 1 page.
Constandache, Ionut et al., "Energy-efficient Localization Via Personal Mobility Profiling", *In Proceedings of MobiCASE 2009*, Available at <http://synrg.ee.duke.edu/papers/mobicase09.pdf>,(Oct. 2009), pp. 1-20.
Dandu, Ravi "Building Next Generation Location-Based Applications", *UPLINQ 2012 Conference*, Available at <https://www.upling.com/system/files/session/slides/Tapping_into_the_Next_Generation_wednesday_430.pdf>,(Jun. 27, 2012), 22 pages.
Domingos, et al., "Mining High-Speed Data Streams", *Proceedings of the Sixth ACM SIGKDD International Conference on Knowledge Discovery and Data Mining*, (2000), 10 Pages.
Flinn, Jason "Extending Mobile Computer Battery Life through Energy-Aware Adaptation", *School of Computer Science, Carnegie Mellon University, Pittsburgh, PA*, retrieved from <http://reports-archive.adm.cs.cmu.edu/anon/2001/CMU-CS-01-171.pdf> from Feb. 5, 2009,(Dec. 2001), 165 pages.
Foster, et al., "Precision and accuracy of an ankle-worn accelerometer-based pedometer in step counting and", *Preventive Medicine*, vol. 41, No. 3-4, (Oct. 2005).
Gaonkar, Shravan et al., "Micro-Blog: Sharing and Querying Content through Mobile Phones and Social Participation", *ACM, MobiSys 2008*, Jun. 17-20, 2008, Breckenridge, CO retrieved from <http://www.cs.duke.edu/~lpcox/romit-microblog.pdf> on Feb. 5, 2009,(Jun. 17, 2008), 13 pages.
Gupta, Monika "Broadcom's Latest GPS Tech Zooms in on Geofencing", Retrieved from <http://blog.broadcom.com/mobile-wireless/ahead-of-mobile-world-congress-broadcoms-latest-gps-tech-zooms-in-on-geofencing/?utm_source=&utm_medium=&utm_campaign=> on May 1, 2013, (Feb. 19, 2013), 5 pages.
Hoh, et al., "Virtual Trip Lines for Distributed Privacy-Preserving Traffic Monitoring", *Proceedings of the 6th International Conference on Mobile Systems, Applications, and Services*, (Jun. 2008), 14 pages.
Hull, et al., "CarTel: A Distributed Mobile Sensor Computing System", *Proceedings of the 4th international conference on Embedded networked sensor systems*, (Nov. 2006), 14 pages.
Israel, Shel "How VinTank is Building a Geo-Fence Around Wine Country", Retrieved from <http://www.forbes.com/sites/shelisrael/2013/03/20/how-vintank-is-building-a-geo-fence-around-wine-country/> on May 1, 2013, (Mar. 20, 2013), 7 pages.
Jacobs, Bart "Geofencing with Core Location", Retrieved from <http://mobile.tutsplus.com/tutorials/iphone/geofencing-with-core-location/> on May 1, 2013, (Mar. 18, 2013), 11 pages.
Kang, et al., "A Scalable and Energy-Efficient Context Monitoring Framework for Mobile Personal Sensor Networks", *IEEE Transactions on Mobile Computing*, vol. 9, No. 5, (May 2010), pp. 686-702.
Kansal, Aman et al., "Location and Mobility in a Sensor Network of Mobile Phones", Microsoft Research, Microsoft Corporation, retrieved from <http://research.microsoft.com.com/apps/pubs/default.aspx?id=70416> on Feb. 5, 2009,(Jun. 4, 2007), 1 pages.

(56) References Cited

OTHER PUBLICATIONS

Krumm, John et al., "Predestination: Inferring Destinations from Partial Trajectories", *UbiComp 2006: The Eighth International Conference on Ubiquitous Computing*, Sep. 17-21, 2006, Orange County, CA, retrieved from <http://research.microsoft.com/en-us/um/people/horvitzlpredestination.pdf> on Feb. 5, 2009,(Sep. 17, 2006), 18 pages.

Krumm, John et al., "RightSPOT: A Novel Sense of Location for a Smart Personal Object", *Proceedings of Ubicomp 2003*, Seattle, WA, retrieved from <http://research.microsoft.com/en-us/um/people/horvitz/rightspot.htm> on Feb. 5, 2009,(2003), 1 pages.

Lamarca, Anthony et al., "Place Lab: Device Positioning Using Radio Beacons in the Wild", *In Proceedings of Pervasive 2005*, Munich, Germany, retrieved from <http://www.placelab.org/publications/pubs/pervasive-placelab-2005-final.pdf> on Feb. 5, 2009,(2005), 18 pages.

Lee, et al., "Mobile Phone-To-Phone Personal Context Sharing", *In Proceedings of 9th International Conference Communications and Information Technology*, (Sep. 28, 2009), 6 Pages.

Lester, et al., "Validated Caloric Expenditure Estimation using a Single Body-Worn Sensor", *Proceedings of the 11th international conference on Ubiquitous computing*, (Oct. 2009), 10 pages.

Lester, et al., "A Practical Approach to Recognizing Physical Activities", *Pervasive Computing in Pervasive Computing*, vol. 3968, (2006), 17 pages.

Liao, Lin et al., "Extracting Places and Activities from GPS Traces Using Hierarchical Conditional Random Fields", *The International Journal of Robotics Research*, vol. 26, No. 1, 119-134, retrieved from <http://ijr.sagepub.com/cgi/content/26/1/119> on Feb. 5, 2009,(2007), 20 pages.

Lin, Kaisen et al., "Energy-Accuracy Trade-off for Continuous Mobile Device Location", *In Proceedings of ACM Mobisys 2010*, Available at <http://research.microsoft.com/apps/pubs/default.aspx?id=120831>,(Jun. 15, 2010), pp. 1-14.

Lin, Tsung-Han et al., "Enabling Energy-Efficient and Quality Localization Services", *National Taiwan University*, retrieved from <http://nslab.ee.ntu.edu.tw/publication/conf/qols-percom06.pdf> on Feb. 5, 2009,(2006), 4 pages.

Lu, et al., "Sound Sense: Scalable Sound Sensing for People-Centric Sensing Applications on Mobile Phones", *Proceedings of the 7th international conference on Mobile systems, applications, and services*, (Jun. 2009), 14 pages.

Miluzzo, et al., "Sensing Meets Mobile Social Networks: The Designs, Implementation and Evaluation of the CenceMe Application", *In Proceedings of the 6th ACM Conference on Embedded Network Sensor Systems*, (Nov. 5, 2008), 14 Pages.

Mohan, et al., "Nericell: Rich Monitoring of Road and Traffic Conditions using Mobile Smartphones", *Proceedings of the 6th ACM conference on Embedded network sensor systems*, (Nov. 2008), 14 pages.

Natili, Giorgio et al., "Web Caching and Web Prefetching", <<http://www.mobilerevamp.org/2011/08/22/web-caching-and-web-prefetching/>>, (Aug. 22, 2011), 5 Pages.

Oh, et al., "A Mobile Context Sharing System using Activity and Emotion Recognition with Bayesian Networks", *In 7th International Conference on Ubiquitous Intelligence & Computing and 7th International Conference on Autonomic & Trusted Computing*, (Oct. 26, 2010), 6 Pages.

Oliver, et al., "Health Gear: A Real-Time Wearable System for Monitoring and Analyzing Physiological Signals", (Apr. 2006), pp. 1-4.

Paek, Jeongyeup et al., "Energy-Efficient Rate-Adaptive GPS-based Positioning for Smartphones", *In Proceedings of MobiSys 2010*, Available at <http://enl.usc.edu/papers/cache/Paek10a.pdf>,(Jun. 2010), 16 pages.

Peng, Chunyi et al., "BeepBeep: A High Accuracy Acoustic Ranging System Using COTS Mobile Devices", *ACM, SenSys 2007*, Nov. 6-9, 2007, Sydney, Australia, retrieved from <http://research.microsoft.com/en-us/groups/wn/sensys106-beepbeep.pdf> on Feb. 5, 2009,(Nov. 6, 2007), 14 pages.

Pering, et al., "The PSI Board: Realizing a Phone-Centric Body Sensor Network", *In 4th International Workshop on Wearable and Implantable Body Sensor Networks*, (2007), 6 Pages.

Person, Jon "Writing Your Own GPS Applications: Part 2", *The Code Project*, retrieved from <http://www.codeproject.com/KB/mobile/WritingGPSApplications2.aspx> on Feb. 5, 2009,(Dec. 20, 2004), 13 pages.

Raento, et al., "Context Phone: A Prototyping Platform for Context-Aware Mobile Applications", *In IEEE Pervasive Computing*, vol. 4, Issue 2, (Apr. 2005), pp. 51-59.

Ravi, et al., "Context-aware Battery Management for Mobile Phones", *Proceedings of the Sixth Annual IEEE International Conference on Pervasive Computing and Communications (PERCOM)*, Retrieved at <<http://www.cs.rutgers.edu/discolab/smartphone/papers/percom08.pdf>>,(2008), 10 Pages.

Riva, et al., "The Urbanet Revolution: Sensor Power to the People!", *IEEE Pervasive Computing*, vol. 6, No. 2, (Apr. 2007), pp. 41-49.

Ruairi, Ronan M., et al., "An Energy-Efficient, Multi-Agent Sensor Network for Detecting Diffuse Events", *IJCAI-07* retrieved from <http://www.aaai.org/Papers/IJCAI/2007/IJCAI07-224.pdf> on Feb. 5, 2009,(2007), pp. 1390-1395.

Schindler, Grant et al., "City-Scale Location Recognition", *IEEE Computer Society Conference on Computer Vision and Pattern Recognition (CVPR)*, retrieved from <http://www.cc.gatech.edu/~phlosoft/files/schindler07cvpr2.pdf> on Feb. 5, 2009,(2007), 7 pages.

Schreiber, et al., "Reducing User Perceived Latency with a Proactive Prefetching Middleware for Mobile SOA Access", *International Journal of Web Services Research*, vol. 8, No. 1, Retrieved from <<http://www.informatik.uni-trier.de/~ley/db/journals/jwsr/jwsr8.html>>,(2011), 18 Pages.

Shin, et al., "DEAMON: Energy-efficient sensor monitoring", *6th Annual IEEE Communications Society Conference on Sensor, Mesh and Ad Hoc Communications and Networks*, (Jun. 22, 2009), 9 pages.

Smailagic, Asim et al., "Location Sensing and Privacy in a Context-Aware Computing Environment", *IEEE Wireless Communications*, retrieved from <http://diuf.unifr.ch/pai/education/2002_2003/seminar/winter/telecom/01043849.pdf> on Feb. 5, 2009,(Oct. 2002), pp. 10-17.

Sun, Guolin et al., "Signal Processing Techniques in Network-aided Positioning", *IEEE Signal Processing Magazine*, Available at <http://www.cspl.umd.edu/sig/publications/sun_survey_200507.pdf>,(Jul. 2005), pp. 12-23.

Wang, et al., "A Framework of Energy Efficient Mobile Sensing for Automatic User State Recognition", *Proceedings o the 7th international conference on Mobile systems, applications, and services*, (Jun. 2009), 14 pages.

Woodman, et al., "Pedestrian Localization for Indoor Environments", *Proceedings of the 10th international conference on Ubiquitous computing*, (Sep. 2008), 10 pages.

Youssef, Moustafa et al., "The Horus WLAN Location Determination System", *Department of Computer Science, University of Maryland*, retrieved from <http://www.cs.umd.edu/~moustafa/papers/horus_usenix.pdf> on Feb. 5, 2009,(2005), 14 pages.

Yu, et al., "Personalized Awareness and Safety with Mobile Phones as Sources and Sinks", *Proceedings of Urbansense, workshop held in conjunction with SenSys*, (Nov. 4, 2008), pp. 26-30.

Zhang, Kaifu et al., "The Two Facets of the Exploration-Exploitation Dilemma", *Proceedings of the IEEE/WIC/ACM International Conference on Intelligent Agent Technology (IAT '06)*, retrieved from <http://ieeexplore.ieee.org/ielx5/4052878/4052879/04052945.pdf?tp=> on Feb. 5, 2009,(2006), 7 pages.

Zhuang, Zhenyun et al., "Improving Energy Efficiency of Location Sensing on Smartphones", *In Proceedings of MobiSys 2010*, Available at <http://www.deutsche-telekom-laboratories.com/~kyuhan/papers/MobiSys10Kim.pdf>,(Jun. 2010), 15 pages.

"Calendar and Reminders Programming Guide", Retrieved at <<http://developer.apple.com/library/ios/documentation/DataManagement/Conceptual/EventKitProgGuide/EventKitProgGuide.pdf>>, Jul. 17, 2012, pp. 25.

(56) References Cited

OTHER PUBLICATIONS

"Non-Final Office Action", U.S. Appl. No. 13/090,474, May 6, 2014, 12 pages.
"Final Office Action", U.S. Appl. No. 12/417,752, Feb. 25, 2014, 22 Pages.
"Final Office Action", U.S. Appl. No. 12/417,752, (Jul. 17, 2013), 18 pages.
"PCT Search Report and Written Opinion", Application No. PCT/US2012/070431, (May 31, 2013),10 pages.
"Final Office Action", U.S. Appl. No. 13/090,474, Nov. 21, 2013, 12 pages.
"Final Office Action", U.S. Appl. No. 13/409,905, Nov. 19, 2013, 13 Pages.
"International Search Report and Written Opinion", Application No. PCT/US2013/060500, Mar. 5, 2014, 10 pages.
"International Search Report and Written Opinion", Application No. PCT/US2013/060502, Mar. 5, 2014, 10 pages.
"International Search Report and Written Opinion", Application No. PCT/US2013/050963, Nov. 8, 2013, 14 pages.
"Non-Final Office Action", U.S. Appl. No. 12/417,752, Feb. 25, 2014, 22 pages.
"Non-Final Office Action", U.S. Appl. No. 12/417,752, Oct. 29, 2013, 16 Pages.
"Non-Final Office Action", U.S. Appl. No. 13/340,702, Mar. 11, 2014, 15 Pages.
"Notice of Allowance", U.S. Appl. No. 12/912,456, Jan. 7, 2014, 9 Pages.
Boytsov, et al.,' "Context Prediction in Pervasive Computing Systems: Achievements and Challenges", International Journal on Computer Science and Engineering vol. 2, No. 04, 2010, 29 Pages.
Consolvo, et al.,' "Location Disclosure to Social Relations: Why, When, & What People Want to Share", Retrieved From: http://cens.ucla.edu/~mhr/cs219/privacy/consolvo05.pdf, Apr. 2-7, 2005, 11 Pages.
Harper, et al.,' "Glancephone—An Exploration of Human Expression", In MobileHCI09, Sep. 15-18, 2009, Bonn, Germany, 9 pages., Sep. 15-18, 2009, 10 Pages.
Makker, et al.,' "A Novel Approach for Predicting User Behavior for Improving Web Performance", International Journal on Computer Science and Engineering, vol. 02, No. 04, 2010, pp. 1233-1236., 2010, 4 Pages.
Schreiber, et al.,' "Reducing User Perceived Latency in Mobile Processes", IEEE International Conference on Web Services, 201 0, pp. 235-242., 2010, 18 Pages.
Schreiber, et al.,' "Reducing User Perceived Latency with a Middleware for Mobile SOA Access", IEEE International Conference on Web Services, 2009, pp. 366-373., 2009, 18 Pages.
Yan, et al.,' "Fast App Launching for Mobile Devices Using Predictive User Context", MobiSys'12, Jun. 25-29, 2012, Low Wood Bay, Lake District, UK., Jun. 25-29, 2012, 14 pages.
"Final Office Action", U.S. Appl. No. 13/090,474, Nov. 25, 2014, 13 pages.
"Non-Final Office Action", U.S. Appl. No. 13/409,905, Apr. 1, 2013, 11 pages.
"Non-Final Office Action", U.S. Appl. No. 13/409,905, Nov. 3, 2014, 14 pages.
"Non-Final Office Action", U.S. Appl. No. 13/918,776, Oct. 22, 2014, 18 pages.
"Non-Final Office Action", U.S. Appl. No. 13/918,810, Nov. 3, 2014, 19 pages.
"Notice of Allowance", U.S. Appl. No. 13/340,702, Jul. 29, 2014, 10 Pages.
"Foreign Office Action", CN Application No. 201210592889.8, Dec. 3, 2015, 6 pages.
"Non-Final Office Action", U.S. Appl. No. 13/090,474, Dec. 3, 2015, 14 pages.
"Non-Final Office Action", U.S. Appl. No. 13/409,905, Jan. 12, 2016, 21 pages.
"Non-Final Office Action", U.S. Appl. No. 13/090,474, Apr. 8, 2015, 11 pages.
"Notice of Allowance", U.S. Appl. No. 13/340,702, Mar. 24, 2015, 12 Pages.
"Final Office Action", U.S. Appl. No. 13/409,995, Apr. 14, 2015, 17 Pages.
"Final Office Action", U.S. Appl. No. 13/918,810, Jun. 3, 2015, 22 pages.
"Final Office Action", U.S. Appl. No. 13/918,776, Jun. 17, 2015, 23 pages.
"Apple—Batteries—iPhone", Available at: http://www.apple.com/batteries/maximizing-performance/, Dec. 29, 2011, 9 pages.
"Foreign Office Action", CN Application No. 201210592889.8, May 6, 2015, 14 pages.
"Foreign Office Action", EP Application No. 12863619.8, May 13, 2015, 5 pages.
"International Preliminary Report on Patentability", Application No. PCT/US2012/070431, Jul. 10, 2014, 7 pages.
"International Search Report and Written Opinion", Application No. PCT/US2013/060501, Apr. 13, 2015, 19 Pages.
"iOS 5 slowing iPhone 4 and 4S complaints", Retrieved at: http://www.phonesreview.co.uk/2011/10/25/ios-5-slowing-iphone-4-and-4s-complaints/, Oct. 10, 2011, 2 pages.
"Link prefetching FAQ", Retrieved at: https://developer.mozilla.org/en-US/docs/Web/HTTP/Link_prefetching_FAQ, Mar. 3, 2003, 5 pages.
"Notice of Allowance", U.S. Appl. No. 13/340,702, Jul. 8, 2015, 8 pages.
"Supplementary European Search Report", EP Application No. 12863619.8, May 4, 2015, 4 pages.
"Tasker", Retrieved from: https://web.archive.org/web/20101229145544/http://tasker.dinglisch.net/, Dec. 29, 2010, 2 pages.
Aggarwal,"Caching on the World Wide Web", IEEE Trans. Knowl. Data Eng., vol. 11, No. 1, 1999, 16 pages.
Bohmer,"Falling Asleep with Angry Birds, Facebook and Kindle—A Large Scale Study on Mobile Application Usage", In Proceedings of the 13th International Conference on Human Computer Interaction with Mobile Devices and Services, Aug. 11, 2011, 11 pages.
Chu,"Mobile Apps: It's Time to Move Up to CondOS", In Proceedings of the 13th USENIX Conference on Hot Topics in Operating Systems, Apr. 15, 2011, 5 pages.
Garlan,"Project Aura: Toward Distraction-Free Pervasive Computing", IEEE Pervasive Computing, vol. 1, 2002, 10 pages.
Joo,"FAST: Quick Application Launch on Solid-State Drives", Proceedings of the 9th USENIX Conference on File and Storage Technologies, Available at <http://static.usenix.org/event/fast11/tech/full_papers/Joo.pdf>, Feb. 15, 2011, 14 pages.
Kamisaka,"Operation Prediction for Context-Aware User Interfaces of Mobile Phones", 2009 Ninth Annual International Symposium on Applications and the Internet, 2009, 7 pages.
Lymberopoulos,"PocketWeb: Instant Web Browsing for Mobile Devices", in ASPLOS'12, 2012, 12 pages.
Miller,"Geographic Data Mining and Knowledge Discovery", Handbook of Geographic Information Science, Taylor & Francis, Inc., 2009, 20 pages.
Qian,"Profiling Resource Usage for Mobile Applications: A Cross-layer Approach", In Proceedings of the 9th international conference on Mobile systems, applications, and services, Jun. 28, 2011, 14 pages.
Satyanarayanan,"Pervasive Computing: Vision and Challenges", In IEEE Personal.Communications, 2001, Aug. 2001, 10 pages.
Shepard,"LiveLab: Measuring Wireless Networks and Smartphone Users in the Field", SIGMETRICS Performance Evaluation Review, vol. 38, Issue 3, Jan. 3, 2011, 5 pages.
Wray,"Daily Tip: How to make your iPhone camera launch instantly [Jailbreak]", Retrieved from: http://www.imore.com/daily-tip-iphone-camera-launch-instantly-jailbreak, Apr. 20, 2011, 11 pages.
Zhu,"Efficient Elastic Burst Detection in Data Streams", In KDD '03, Proceedings of the Ninth ACM SIGKDD international Conference on Knowledge Discovery and Data Mining, Aug. 24, 2003, 10 pages.

(56) References Cited

OTHER PUBLICATIONS

"BroadCloud FamilyCenter", BroadSoft Data Sheet—retrieved from <http://www.broadsoft.com/pdf/datasheet-broadcloud-familycenter.pdf> on Dec. 13, 2011, 1 page.
"Find My Friends app goes live ahead of iOS 5 release", Retrieved at: http://9to5mac.com/2011/10/12/find-my-friends-app-goes-live-ahead-of-ios-5-release/, Oct. 12, 2011, 10 pages.
"Non-Final Office Action", U.S. Appl. No. 13/919,479, Jan. 2, 2015, 13 pages.
"Non-Final Office Action", U.S. Appl. No. 13/726,043, Sep. 11, 2014, 14 pages.
"Non-Final Office Action", U.S. Appl. No. 13/919,479, Feb. 3, 2015, 15 pages.
"Notice of Allowance", U.S. Appl. No. 13/726,043, May 4, 2016, 15 pages.
"iCloud: What You Need to Know", MacWorld.com—retrieved from <http://www.macworld.com/article/160380/2011/06/icloud_what_you_need_to_know.html > on Dec. 13, 2011, Jun. 8, 2011, 16 pages.
"Final Office Action", U.S. Appl. No. 13/919,479, Aug. 13, 2015, 18 pages.
"Final Office Action", U.S. Appl. No. 13/726,043, Mar. 3, 2015, 19 pages.
"Your Very Own Support Geek", retrieved from <http://yoursupportgeek.info/miscellaneous-geek-stuff/t-mobile-uk-to-offer-icd-vega-15-inch-tegra-android-tablet-in-2010> on Dec. 13, 2011, Jan. 7, 2010, 2 pages.
"Safe Driving System", Retrieved from <http://web.archive.org/web/20100512220953/http://key2safedriving.com/>, May 12, 2010, 2 pages.
"Non-Final Office Action", U.S. Appl. No. 13/726,043, Oct. 8, 2015, 20 pages.
"Non-Final Office Action", U.S. Appl. No. 13/918,810, Apr. 20, 2016, 28 pages.
"Advisory Action", U.S. Appl. No. 13/919,479, Dec. 31, 2015, 3 pages.
"Distracted Driving Information Clearinghouse", Retrieved from <http://www.fcc.gov/encyclopedia/distracted-driving-information-clearinghouse>, Jul. 27, 2011, 4 pages.
"Parental Control Software for Cell Phones", retrieved from <http://www.parentalcontrolcellphones.com/> on Dec. 8, 2011, Apr. 30, 2010, 5 pages.
"Extended European Search Report", EP Application No. 12883789.5, Apr. 22, 2016, 7 pages.
"Foreign Office Action", CN Application No. 201210592889.8, Mar. 11, 2016, 8 pages.
"Non-Final Office Action", U.S. Appl. No. 13/919,479, May 3, 2016, 8 pages.
"Finally, A Location-Sharing App That's Less Creepy Than Foursquare", Retrieved at: http://www.fastcodesign.com/1670275/finally-a-location-sharing-app-thats-less-creepy-than-foursquare, Jul. 11, 2012, 8 pages.
Bilderbeek,"From Unified to Social Communications and Collaboration", retrieved from <http://www.themetisfiles.com/2011/10/from-unified-to-social-communications-and-collaboration/> on Dec. 13, 2011, Oct. 25, 2011, 4 pages.
Brian,"Space-time for iOS: The simple app that lets you request a person's location regardless of their smartphone", Retrieved at: http://thenextweb.com/apple/2012/04/20/spacetime-for-ios-the-simple-app-that-lets-you-request-a-persons-location-regardless-of-their-smartphone/#gref, Apr. 20, 2012, 7 pages.
Davies,"T-Mobile UK to Offer ICD Vega 15-inch Tegra Android Tablet in 2010", Retrieved from <http://www.slashgear.com/t-mobile-uk-to-offer-icd-vega-15-inch-tegra-android-tablet-in-2010-0768671/> on Mar. 11, 2013, Jan. 7, 2010, 7 pages.
DiPane,"Sprint to Bring Parental Locks to Android Phones to Prevent Use While Driving", retrieved from <http://www.androidcentral.com/sprint-bring-parental-locks-android-phones-prevent-use-while-driving> on Dec. 8, 2011, Mar. 22, 2011, 7 pages.

Kharif,"Parental Controls for Mobile Phones? You Bet", Tech Beat, retrieved from <http://www.businessweek.com/the_thread/techbeat/archives/2005/08/parental_contro.html> on Dec. 8, 2011, Aug. 16, 2005, 12 pages.
LeBlanc,"The Device Experience in Windows 7—Updated", Windows 7 Team Blog, retrieved from <http://windowsteamblog.com/windows/archive/b/windows7/archive/2009/09/01/the-device-experience-in-windows-7-updated.aspx> on Dec. 13, 2011, Sep. 1, 2009, 14 pages.
Mui,"The Lifesaving Smartphone Feature That We Need: Driving Mode", Retrieved from <http://www.forbes.com/sites/chunkamui/2011/12/19/the-smart-phone-feature-that-we-need-driving-model>, Dec. 19, 2011, 4 pages.
Nagpal,"We're in, Location Sharing App from Microsoft Released for WP7", Available at: http://www.igyaan.in/15078/in-location-sharing-app-microsoft-released-wp7/, Aug. 19, 2011, 13 pages.
Nasar,"Mobile Telephones, Distracted Attention, and Pedestrian Safety", Accident Analysis & Prevention, retrieved from <http://facweb.knowlton.ohiostate.edu/jnasar/crpinfo/research/MobilePhones_AAP_2007.pdf> on Dec. 8, 2011, Jan. 2008, pp. 69-75.
Patten,"Using Mobile Telephones: Cognitive Workload and Attention Resource Allocation", Accident Analysis and Prevention, retrieved from <http://beta.nsc.org/safety_road/Distracted_Driving/Documents/Using%20mobile%20telephones,%20cognitive%20workload%20and%20attention%20resource%20allocation.pdf> on Dec. 8, 2011, May 2004, pp. 341-350.
Saenz,"Unlock Your Door with Your Phone, Text a Key to a Friend—Lockitron is Awesome (video)", Retrieved from: <http://singularityhub.com/2011/05/24/unlock-your-door-with-your-phone-text-a-key-to-a-friend-lockitron-is-awesome-video/> on Feb. 10, 2012, May 24, 2011, 3 pages.
Tiemann,"AT&T Adds Parental Control Options to Cell Phones", CNET News—retrieved from <http://news.cnet.com/8301-13507_3-9770506-18.html> on Dec. 8, 2011, Sep. 7, 2007, 1 pages.
Warren,"Microsoft Flaunts Metro Style PowerPoint Live Tiles", WinRumors—retrieved from <http://www.winrumors.com/microsoft-flaunts-metro-style-powerpoint-live-tiles-video/> on Dec. 13, 2011, Jul. 11, 2011, 12 pages.
Webster,"Location sharing app Glympse gets major update", Retrieved at:.http://www.androidguys.com/2012/10/16/location-sharing-app-glympse-gets-major-update/, Oct. 16, 2012, 5 pages.
Williams,"AT&T Drive Mode, The Anti-Texting While Driving Mobile Solution (video)", Retrieved from <http://www.talkandroid.com/66579-att-drive-mode-the-anti-texting-while-driving-mobile-solution-video/>, Oct. 13, 2011, 6 pages.
Wood,"Hey, Phone Makers: Where's 'Driving Mode'?", Retrieved from <http://news.cnet.com/8301-31322_3-20003824-256.html>, Apr. 29, 2010, 3 pages.
"CameraLock Cydia Tweak—Add a Camera Button to Your Lockscreen Without iOS 5—iPhone & iPpd Touch", Retrieved from: https://www.youtube.com/watch?v=ECGm54OB6e0, Jun. 21, 2011, 1 page.
"Corrected Notice of Allowance", U.S. Appl. No. 13/726,097, Aug. 21, 2014, 2 pages.
"Corrected Notice of Allowance", U.S. Appl. No. 13/726,097, Oct. 1, 2014, 2 pages.
"EP Search Report", EP Application No. 09747072.8, Jan. 17, 2003, 5 Pages.
"Extended European Search Report", EP Application No. 12859600.4, May 13, 2015, 7 pages.
"Final Office Action", U.S. Appl. No. 12/194,213, Sep. 20, 2011, 11 Pages.
"Final Office Action", U.S. Appl. No. 12/897,586, May 22, 2013, 4 pages.
"Final Office Action", U.S. Appl. No. 12/912,456, Sep. 6, 2013, 22 pages.
"Final Office Action", U.S. Appl. No. 13/090,474, Aug. 26, 2016, 15 pages.
"Final Office Action", U.S. Appl. No. 13/222,538, May 28, 2013, 43 pages.
"Final Office Action", U.S. Appl. No. 13/726,027, Jan. 5, 2015, 19 pages.

(56) References Cited

OTHER PUBLICATIONS

"Final Office Action", U.S. Appl. No. 13/726,090, Oct. 2, 2014, 30 pages.
"Final Office Action", U.S. Appl. No. 13/726,095, May 8, 2015, 13 pages.
"Final Office Action", U.S. Appl. No. 13/726,099, May 8, 2015, 11 pages.
"Final Office Action", U.S. Appl. No. 13/726,099, Aug. 29, 2014, 10 pages.
"Final Office Action", U.S. Appl. No. 13/875,139, May 9, 2014, 15 Pages.
"Final Office Action", U.S. Appl. No. 14/686,300, Jul. 29, 2015, 13 pages.
"Foreign Notice of Allowance", AU Application No. 2011312743, Nov. 25, 2014, 2 Pages.
"Foreign Notice of Allowance", CN Application No. 200980128048.8, Jun. 19, 2014, 4 Pages.
"Foreign Office Action", AU Application No. 2011312743, Aug. 15, 2014, 4 Pages.
"Foreign Office Action", AU Application No. 2011312743, Jun. 20, 2014, 4 Pages.
"Foreign Office Action", CL Application No. 201300886, Feb. 2, 2015, 7 pages.
"Foreign Office Action", CL Application No. 201300886, May 13, 2015, 7 pages.
"Foreign Office Action", CN Application No. 200980128048.8, May 6, 2013, 7 Pages.
"Foreign Office Action", CN Application No. 200980128048.8, Dec. 2, 2013, 7 pages.
"Foreign Office Action", CN Application No. 200980128048.8, Dec. 19, 2012, 11 Pages.
"Foreign Office Action", CN Application No. 201110317851.5, May 20, 2015, 8 pages.
"Foreign Office Action", CN Application No. 201110317851.5, Nov. 14, 2014, 15 Pages.
"Foreign Office Action", CN Application No. 201110317851.5, Dec. 4, 2013, 14 pages.
"Foreign Office Action", CN Application No. 201110317851.5, May 8, 2014, 10 Pages.
"Foreign Office Action", EP Application 12859972.7, May 26, 2015, 4 pages.
"Foreign Office Action", EP Application No. 11831134.9, May 9, 2014, 3 Pages.
"Foreign Office Action", EP Application No. 12859485.0, Feb. 12, 2015, 5 pages.
"Foreign Office Action", EP Application No. 12859600.4, Jun. 1, 2015, 8 Pages.
"Foreign Office Action", EP Application No. 12860373.5, Jul. 7, 2015, 6 pages.
"Foreign Office Action", EP Application No. 12860631.6, Feb. 16, 2015, 5 pages.
"Foreign Office Action", JP Application No. 2013-532806, Jun. 10, 2015, 11 pages.
"How can I see a list of all users on the logon screen?", Retrieved from <http://superuser.com/questions/354856/how-can-i-see-a-list-of-all-users-on-the-logon-screen> on Jan. 6, 2015, Nov. 7, 2011, 2 pages.
"How can one add an image to the windows 7 login screen? A", Retrieved from <http://superuser.com/questions/470568/how-can-one-add-an-image-to-the-windows-7-login-screen> on Jan. 6, 2015., Sep. 5, 2012, 4 pages.
"In Case of Emergency (ICE) and smart phone with lock screens", Ars Technica OpenForum—Retrieved at: http://arstechnica.com/civis/viewtopic.php?f=20&t=1140661, Mar. 29, 2011, 8 pages.
"International Search Report and Written Opinion", Application No. PCT/US2012/071559, Mar. 28, 2013, 10 pages.
"International Search Report and Written Opinion", Application No. PCT/US2012/071546, Apr. 29, 2013, 10 pages.
"International Search Report and Written Opinion", Application No. PCT/US2011/049614, Mar. 26, 2012, 7 pages.
"International Search Report and Written Opinion", Application No. PCT/US2009/039509, Nov. 18, 2009, 8 Pages.
"International Search Report and Written Opinion", Application No. PCT/US2012/071545, Mar. 28, 2013, 9 pages.
"International Search Report and Written Opinion", Application No. PCT/US2012/071557, Mar. 28, 2013, 9 pages.
"International Search Report and Written Opinion", Application No. PCT/US2012/071555, Apr. 25, 2013, 9 pages.
"iPad Parental Control (restricting app access)", iPad Reviews, Jailbreak Guides; last retrieved from http://ipaded.net/ipad/parental-control/ on Feb. 29, 2012, 5 pages.
"Mobile Phone Match-Up", Retrieved at: <http://www.microsoft.com/windowsmobile/enus/meet/version-compare.mspx>, Jul. 27, 2010, 4 pages.
"Mobile Task Tracker Screen Shots", Retrieved from <http://www.mobiletasktracker.com/Screen%20Shots.html>, Jul. 13, 2011, 4 Pages.
"No Tech Panacea for Tech-Distracted Driving", http://mobile.slashdot.org/story/12/06/11/0556231/no-tech-panacea-for . . . , Dec. 6, 2011, 30 Pages.
"Non Final Office Action", U.S. Appl. No. 13/222,538, Feb. 14, 2013, 33 Pages.
"Non-Final Office Action", U.S. Appl. No. 12/194,213, Mar. 17, 2011, 11 Pages.
"Non-Final Office Action", U.S. Appl. No. 12/897,586, May 8, 2014, 12 pages.
"Non-Final Office Action", U.S. Appl. No. 12/897,586, Oct. 18, 2012, 12 pages.
"Non-Final Office Action", U.S. Appl. No. 12/912,456, May 29, 2013, 20 pages.
"Non-Final Office Action", U.S. Appl. No. 13/222,538, Oct. 11, 2013, 38 pages.
"Non-Final Office Action", U.S. Appl. No. 13/328,312, Aug. 6, 2013, 18 pages.
"Non-Final Office Action", U.S. Appl. No. 13/726,027, Jun. 24, 2014, 17 pages.
"Non-Final Office Action", U.S. Appl. No. 13/726,040, Jan. 28, 2015, 14 pages.
"Non-Final Office Action", U.S. Appl. No. 13/726,048, Dec. 9, 2014, 12 pages.
"Non-Final Office Action", U.S. Appl. No. 13/726,049, Jul. 7, 2015, 14 pages.
"Non-Final Office Action", U.S. Appl. No. 13/726,049, Dec. 4, 2014, 9 pages.
"Non-Final Office Action", U.S. Appl. No. 13/726,090, Jun. 23, 2015, 31 pages.
"Non-Final Office Action", U.S. Appl. No. 13/726,090, Jun. 24, 2014, 28 pages.
"Non-Final Office Action", U.S. Appl. No. 13/726,092, Feb. 12, 2015, 21 pages.
"Non-Final Office Action", U.S. Appl. No. 13/726,095, Jan. 5, 2015, 14 pages.
"Non-Final Office Action", U.S. Appl. No. 13/726,095, Aug. 15, 2014, 12 pages.
"Non-Final Office Action", U.S. Appl. No. 13/726,099, Jan. 7, 2015, 10 pages.
"Non-Final Office Action", U.S. Appl. No. 13/726,099, Mar. 18, 2014, 8 pages.
"Non-Final Office Action", U.S. Appl. No. 13/875,139, Oct. 3, 2013, 12 pages.
"Non-Final Office Action", U.S. Appl. No. 13/875,139, Oct. 24, 2014, 15 Pages.
"Non-Final Office Action", U.S. Appl. No. 14/495,418, Jul. 2, 2015, 18 pages.
"Non-Final Office Action", U.S. Appl. No. 14/686,300, Jun. 8, 2015, 11 pages.
"Notice of Allowance", U.S. Appl. No. 12/194,213, May 31, 2013, 11 Pages.
"Notice of Allowance", U.S. Appl. No. 12/194,213, Jun. 27, 2012, 16 Pages.
"Notice of Allowance", U.S. Appl. No. 12/194,213, Dec. 21, 2012, 13 Pages.

(56) References Cited

OTHER PUBLICATIONS

"Notice of Allowance", U.S. Appl. No. 12/897,586, Jan. 5, 2015, 7 Pages.
"Notice of Allowance", U.S. Appl. No. 12/897,586, Oct. 15, 2014, 13 Pages.
"Notice of Allowance", U.S. Appl. No. 13/726,043, Aug. 16, 2016, 8 pages.
"Notice of Allowance", U.S. Appl. No. 13/726,095, Aug. 28, 2015, 6 pages.
"Notice of Allowance", U.S. Appl. No. 13/726,097, Jun. 10, 2014, 7 pages.
"Notice of Allowance", U.S. Appl. No. 13/875,139, Mar. 5, 2015, 7 pages.
"Restrict Access to Applications using AppLocker", Retrieved from: <http://www.dq.winsila.com/tips-tricks/restrict-access-to-applications-using-applocker.html> on Feb. 13, 2012, Jan. 5, 2012, 2 pages.
"Restrict Access to Programs with AppLocker in Windows 7", Retrieved from <http://www.howtogeek.com/howto/6317/block-users-from-using-certain-applications-with-applocker/> on Jan. 6, 2015., Nov. 12, 2009, 9 pages.
"Restriction Requirement", U.S. Appl. No. 13/726,048, Jun. 20, 2014, 5 pages.
"Restriction Requirement", U.S. Appl. No. 13/726,049, Jul. 1, 2014, 6 pages.
"Restriction Requirement", U.S. Appl. No. 13/726,097, Mar. 21, 2014, 7 pages.
"Setting up and Using Smart Unlock on the Samsung Jet", Retrieved at: <http://www.knowyourmobile.com/samsung/samsungjet/samsungjetuserguides/317988/setting_up_and_using_smart_unlock_on_the_samsung_jet.html>, Jun. 20, 2010, 2 pages.
"Setting Up Simple Restricted Access", Retrieved at: http://support.webvanta.com/support_article/615777-setting-up-simple-restricted-access—on Feb. 29, 2012, 3 Pages.
"Supplemental Notice of Allowance", U.S. Appl. No. 12/897,586, Mar. 3, 2015, 2 Pages.
"Supplementary European Search Report", EP Application No. 12859485.0, Jan. 23, 2015, 4 pages.
"Supplementary European Search Report", EP Application No. 12859972.7, Apr. 30, 2015, 3 pages.
"Supplementary European Search Report", EP Application No. 12860373.5, Jun. 25, 2015, 3 pages.
"Supplementary European Search Report", EP Application No. 12860631.6, Jan. 5, 2015, 3 pages.
"Supplementary Search Report", EP Application No. 11831134.9, Apr. 3, 2014, 3 pages.
"Timeline of Microsoft Windows", Retrieved from <http://en.wikipedia.org/wiki/Timeline_of_Microsoft_Windows> on Jan. 6, 2015, Dec. 14, 2014, 5 pages.
"T-Mobile G1 Google Android Phone—Gesture Unlocking", Retrieved at: <http://www.gadgetuniversegift.com/?p=2121>, Jun. 20, 2010, 2 pages.
"T-Mobile G1 User Manual", pp. 102-103, May 27, 2009, 5 pages.
"Welcome to Sprint Drive First", Retrieved at <<https://drivefirst.sprint.com/welcome.htm>> on Nov. 20, 2013, 2013, 2 pages.
Aventail,"Aventail and Trust Digital Launch Integrated Secure Mobile Access Solution", http://findarticles.com/p/articles/mi_pwwi/is_200602/ai_n16063742/?tag=content;col1, Last accessed May 14, 2008, Feb. 2006, 3 Pages.
Bhandari,"Full Touchscreen Samsung Star (S5233), Star 3G (S5603) and BEAT DJ Launced in India", Retrieved at: http://www.tecfre.com/full-touchscreen-samsung-star-s5233-star-3g-s5603-and-beat-dj-launched-in-india/, May 11, 2009, 12 pages.
Branscombe,"Kids Corner and Wallet", Retrieved from <http://www.techradar.com/reviews/pc-mac/software/operating-systems/windows-phone-8-1086692/review/6>, Jan. 25, 2012, 7 pages.
Campbell,"Biometrically Enhanced Software-Defined Radios", Proc. Software Defined Radio Technical Conf, Orlando, Florida, Nov. 2003, 6 Pages.
Chen,"Here's the Google Phone Apple Wants You to Have", Retrieved at: http://www.wired.com/2010/03/apple-htc-google/, Mar. 5, 2010, 9 pages.
Ciprian,"Manage User Accounts", Retrieved at: http://www.vista4beginners.com/Manage-User-Accounts, May 8, 2007, 13 pages.
Covington,"Parameterized Authentication", Proc. 9th European Symposium on Research Computer Security, Lecture notes in Computer Science, Sep. 2004, 18 Pages.
Cui,"Facilitating Consumption of Online Social Networking Services on Mobile Devices", Proceedings of the 13th international conference on Ubiquitous Computing, Sep. 17, 2011, 4 Pages.
Hoffmann,"Multilateral Security in Mobile Applications and Location Based Services", https://users.cs.jmu.edu/bernstdh/web/CS685/papers/hoffman-et-al-2002.pdf, Last accessed May 14, 2008, 2002, 18 Pages.
Jagadeesan,"A Novel Approach to Design of User Re-Authentication Systems", Proc. 3rd IEEE Intl. Conf. on Biometrics: Theory, Applications and Systems, Sep. 2009, 6 Pages.
King,"Mobile Device Child Share", U.S. Appl. No. 13/726,095, Mar. 21, 2013, 57 Pages.
Klosterman,"Secure Continuous Biometric-Enhanced Authentication", Technical Report, May 2000, May 2000, 25 Pages.
Kottahachchi,"Access Controls for Intelligent Environments", In: Proceedings of ISDA '04: 4th Annual International Conference on Intelligent Systems Design and Applications. Budapest, Hungary (2004), 2004, 6 Pages.
Lifehacker,"Get the Most Out of Your iPhone's Notification Center, from Beginner to Jailbreaker", Available online at <http://lifehacker.com/5882947/get-the-most-out-of-ios-Ss-notification-center-frombeginner-to-jailbreakerl>, retrieved on Jul. 29, 2014, Feb. 7, 2012, 8 pages.
Liu,"xShare: Supporting Impromptu Sharing of Mobile Phones", In Proceedings of the 7th international conference on Mobile systems, applications, and services, Jun. 22, 2009, pp. 15-28.
McGlaun,"Fixes for Distracted Driving Remain Unclear", http://www.dailytech.com/article.aspx?newsid=24903, Jun. 12, 2012, 2 Pages.
Moran,"Getting Started with Windows 7", 2009, 412 pages.
Niino,"There was free enterprise microblogging, Japanese were developed "youRoom!" Free plan upgrade just mutter", Retrieved from <http://www.publickey1.jp/blog/10/youroom.html>, Dec. 21, 2010, 4 Pages.
OSXDaily,"How to Use the lock Screen Camera in iOS 5.1", Available online at <http://osxdaily.com/2012/03/08/lock-screen-camera-ios-5-1>, retrieved on Jul. 29, 2014, Mar. 8, 2012, 10 pages.
Quick,"BizzTrust for Android splits a single smartphone into two virtual phones", http://www.gizmag.com/bizztrust-for-android/20114/, Retrieved on Jan. 10, 2012, Oct. 2011, 4 Pages.
Raja,"How to Replace and Customize Android Lock Screen [Guide]", Retrieved at: http://www.addictivetips.com/mobile/how-to-replace-and-customize-android-lock-screen-guide/, Jun. 10, 2011, 14 pages.
Samberg,"Stay Focused While Driving", Retrieved from <<http://www.verizonwireless.com/news/2012/09/safely-go-driving-app.html>> on Nov. 20, 2013, Sep. 13, 2012, 5 pages.
Simonite,"One Smart Phone, Two Personalities", http://www.technologyreview.com/communications/38865/, Retrieved Jan. 10, 2012, Oct. 13, 2011, 3 Pages.
Stajano,"One user, many hats; and, sometimes, no hat?towards a secure yet usable pda", Security Protocols Workshop, Springer Verlag, 2004, 14 Pages.
Talbot,"App Battles Driver Distraction but Spares Passengers", Technology Review India published by MIT, http://www.technologyreview.in/news/426889/app-battles-driver-distraction-but-spares-passengers, Feb. 14, 2012, 2 pages.
Temporale,"Removing Application Lock on Windows Mobile Standard Devices", http://www.mobilejaw.com/articles/2009/09/removing-application-lock-on-windows-mobile-standard-devices/, Retrieved on Oct. 13, 2011, Sep. 4, 2009, 10 Pages.
Weilenmann,"Local Use and Sharing of Mobile Phones", In B. Brown, N. Green & R. Harper (Eds.) Wireless World: Social and

(56) References Cited

OTHER PUBLICATIONS

Interactional Aspects of the Mobile Age. Godalming and Hiedleburg: Springer Verlag, 2001, pp. 99-115.
Zaplata,"Context-based Cooperation in Mobile Business Environments—Managing the Distributed Execution of Mobile Processes", Business & Information Systems Engineering, Apr. 2009, pp. 301-314.
"Android Developers Reference: Locationmanager", Retrieved at: <<http://developer.android.com/>>—on Jun. 27, 2009, 1 page.
"Bluecasting—Wikipedia", Retrieved from the Internet on Oct. 2, 2008 at <<http://en.wikipedia.org/wiki/Bluecasting, 1 pages.
"Bluetooth Specification", Retrieved at: <<http://bluetooth.com/>>—on Oct. 19, 2008, 1 page.
"Corrected Notice of Allowance", U.S. Appl. No. 14/495,418, Feb. 25, 2016, 2 pages.
"Corrected Notice of Allowance", U.S. Appl. No. 14/495,418, Feb. 29, 2016, 2 pages.
"Ex Parte Quayle Action", U.S. Appl. No. 13/551,613, Mar. 9, 2016, 4 pages.
"Final Office Action", U.S. Appl. No. 13/222,538, Jan. 27, 2014, 39 pages.
"Final Office Action", U.S. Appl. No. 13/551,613, Mar. 11, 2015, 14 pages.
"Final Office Action", U.S. Appl. No. 13/726,031, Mar. 24, 2016, 20 pages.
"Final Office Action", U.S. Appl. No. 13/726,031, Apr. 13, 2015, 14 pages.
"Final Office Action", U.S. Appl. No. 13/726,048, Aug. 5, 2015, 13 pages.
"Final Office Action", U.S. Appl. No. 13/726,049, Feb. 1, 2016, 15 pages.
"Final Office Action", U.S. Appl. No. 13/726,090, Dec. 15, 2015, 34 pages.
"Final Office Action", U.S. Appl. No. 13/918,810, Oct. 18, 2016, 25 pages.
"Final Office Action", U.S. Appl. No. 14/686,300, Apr. 8, 2016, 16 pages.
"Foreign Notice of Allowance", Application No. 201110317851.5, Dec. 2, 2015, 4 pages.
"Foreign Notice of Allowance", CN Application No. 201210592889.8, Aug. 18, 2016, 4 pages.
"Foreign Office Action", CN Application No. 201380038072.9, Dec. 31, 2015, 14 pages.
"Foreign Office Action", EP Application No. 12860403.0, May 20, 2015, 4 pages.
"Foreign Office Action", EP Application No. 12860631.6, Apr. 21, 2016, 5 pages.
"How to Set Up an ICE Contact on Your iPhone", Retrieved at: https://rnn10.wordpress.com/2010/06/21/how-to-set-up-an-ice-contact-on-your-iphone/, Jun. 21, 2010, 14 pages.
"International Preliminary Report on Patentability", Application No. PCT/US2013/050963, Jan. 29, 2015, 11 pages.
"International Preliminary Report on Patentability", Application No. PCT/US2011/049614, Apr. 18, 2013, 5 pages.
"International Preliminary Report on Patentability", Application No. PCT/US2012/071562, Mar. 12, 2015, 6 pages.
"International Preliminary Report on Patentability", Application No. PCT/US2012/071544, Jul. 3, 2014, 6 pages.
"International Preliminary Report on Patentability", Application No. PCT/US2012/071545, Jul. 3, 2014, 6 pages.
"International Preliminary Report on Patentability", Application No. PCT/US2009/039509, Nov. 25, 2010, 6 pages.
"International Preliminary Report on Patentability", Application No. PCT/US2012/071559, Jul. 3, 2014, 7 pages.
"International Search Report and Written Opinion", Application No. PCT/US2012/071544, Feb. 27, 2013, 9 pages.
"iOS 5", Retrieved from <https://en.wikipedia.org/wiki/IOS_5, Oct. 12, 2011, 6 pages.
"Kids Place—Parental Control", Retrieved at <<http://www.amazon.com/Kiddoware-Kids-Place-Parental-Control/dp/B0061S073A>>—On May 29, 2013, Oct. 31, 2011, 5 pages.
"Location-Based Social Networking Marketing White Paper", The Marketer's Guide to Location-Based Social Networks, Anvil Media, Inc., 2010, 14 pages.
"Non-Final Office Action", U.S. Appl. No. 13/551,613, Jul. 16, 2015, 10 pages.
"Non-Final Office Action", U.S. Appl. No. 13/551,613, Aug. 13, 2014, 9 pages.
"Non-Final Office Action", U.S. Appl. No. 13/726,031, Jul. 8, 2014, 13 pages.
"Non-Final Office Action", U.S. Appl. No. 13/726,031, Aug. 27, 2015, 17 pages.
"Non-Final Office Action", U.S. Appl. No. 13/726,048, Nov. 20, 2015, 14 pages.
"Non-Final Office Action", U.S. Appl. No. 13/726,090, Jun. 3, 2016, 21 pages.
"Non-Final Office Action", U.S. Appl. No. 13/726,099, Jun. 23, 2016, 14 pages.
"Non-Final Office Action", U.S. Appl. No. 14/686,300, Nov. 30, 2015, 12 pages.
"Non-Final Office Action", U.S. Appl. No. 14/746,763, Jun. 30, 2016, 6 pages.
"Non-Final Office Action", U.S. Appl. No. 14/746,763, Nov. 6, 2015, 11 pages.
"Notice of Allowance", U.S. Appl. No. 13/222,538, May 13, 2014, 11 pages.
"Notice of Allowance", U.S. Appl. No. 13/328,312, Jan. 2, 2014, 9 pages.
"Notice of Allowance", U.S. Appl. No. 13/551,613, Jun. 6, 2016, 5 pages.
"Notice of Allowance", U.S. Appl. No. 13/726,048, Mar. 28, 2016, 8 pages.
"Notice of Allowance", U.S. Appl. No. 13/726,049, Jun. 9, 2016, 8 pages.
"Notice of Allowance", U.S. Appl. No. 13/726,049, Jul. 18, 2016, 8 pages.
"Notice of Allowance", U.S. Appl. No. 14/495,418, Feb. 5, 2016, 7 pages.
"Notice of Allowance", U.S. Appl. No. 14/495,418, Jul. 11, 2016, 7 pages.
"Notice of Allowance", U.S. Appl. No. 14/495,418, Oct. 7, 2015, 7 pages.
"Restriction Requirement", U.S. Appl. No. 13/551,613, Mar. 21, 2014, 8 pages.
"Summons to Attend Oral Proceedings", EP Application No. 12859485.0, May 4, 2016, 8 pages.
"Supplemental Notice of Allowance", U.S. Appl. No. 14/495,418, Aug. 12, 2016, 2 pages.
"Supplementary European Search Report", EP Application No. 12860403.0, May 4, 2015, 3 pages.
Amin,"Fancy a Drink in Canary Wharf?: A User Study on Location-Based Mobile Search", Proceedings of the 12th IFIP TC 13 International Conference on Human-Computer Interaction: Part 1, Aug. 24, 2009, 14 pages.
Ashbrook,"Using GPS to Learn Significant Locations and Predict Movement Across Multiple Users", Personal and Ubiquitous Computing, vol. 7, No. 5, Oct. 2003, 15 pages.
Cramer,"Performing a Check-in: Emerging Practices, Norms and 'Conflicts' in Location-Sharing Using Foursquare", MOBILECHII 2011, ACM, 2011, 10 pages.
Dissanayake,"A Solution to the Simultaneous Localization and Map Building (SLAM) Problem", Proceedings of IEEE Transactions on Robotics and Automation, vol. 17, No. 3, Jun. 2001, 14 pages.
Farrell,"Energy-Efficient Monitoring of Mobile Objects with Uncertainty-Aware Tolerances", Proceedings of the 11th International Database Engineering and Applications Symposium, IDEAS 2007, Sep. 2007, 12 pages.
Galloway,"Android Parental Control Contains Kid Access to Your Smartphone", Retrieved at <<http://lifehacker.com/5835066/android-parental-control-contains-kid-access-to-your-smartphone>> on May 29, 2013, Aug. 27, 2011, 3 pages.

(56) References Cited

OTHER PUBLICATIONS

Gupta,"Adding GPS-Control to Traditional Thermostats: An Exploration of Potential Energy Savings and Design Challenges", Proceedings of the 7th International Conference on Pervasive Computing, May 2009, 18 pages.
Horvitz,"Predestination", U.S. Appl. No. 60/721,879, filed Sep. 29, 2005, 31 pages.
Kamvar,"Deciphering Trends in Mobile Search", IEEE Computer Society, Aug. 2007, 5 pages.
Karlson,"Owner Privacy in a Shared Mobile Device", U.S. Appl. No. 61/052,455, filed May 12, 2008, 27 pages.
Karlson,"Usage Profiles for the Mobile Phone", Workshop on Security and Privacy Issues in Mobile Phone Use, May 2008, 3 pages.
Kjaergaard,"Entracked: Energy-Efficient Robust Position Tracking for Mobile Devices", Proceedings of the 7th International Conference on Mobile Systems, Applications, and Services, Jun. 2009, 14 pages.
Kupper,"Efficient Proximity and Separation Detecting among Mobile Targets for Supporting Location-based Community Services", Mobile Computing and Communications Review, vol. 10, No. 3, Jul. 2006, 12 pages.
Lin,"Energy-Accuracy Aware Localization for Mobile Devices", In Proceedings of MobiSys 2010, Available at <http://research.microsoft.com/apps/pubs/default.aspx?id=120831>, Jun. 2010, pp. 1-14.
Liu,"Location Awareness Through Trajectory Prediction", Computers, Environment and Urban Systems 30.6, Jan. 2006, 16 pages.
Matthews,"Mobile Device Check-In", U.S. Appl. No. 61/580,119, filed Dec. 23, 2011, 19 pages.
Morton,"6 Geolocation Apps You May Not Have Heard About", retrieved from <http://www.r2integrated.com/blog/index.php/6-geolocation-apps-you-may-not-have-heard-of/> on Dec. 9, 2011, Mar. 27, 2011, 4 pages.
Priyantha,"Demo Abstract: Enabling Energy Efficient Continuous Sensing on Mobile Phones with LittleRock", Proceedings of the 9th ACM/IEEE International Conference on Information Processing in Sensor Networks, Apr. 2010, 2 pages.
Sadeh,"Understanding and Capturing People's Privacy Policies in a People Finder Application", Personal and Ubiquitous Computing vol. 13 Issue 6, Aug. 2009, retrieved from <http://www.casos.cs.cmu.edu/publications/papers/2009UnderstandingCapturingPeoples.pdf> on Dec. 9, 2011, Aug. 2009, 13 pages.
Sharkey,"Coding for Life-Battery Life, That Is", Google IO Developer Conference, May 7, 2009, 32 pages.
Steenson,"Beyond the Personal and Private: Modes of Mobile Phone Sharing in Urban India", Mobile Communication Research Annual, vol. 1 Transition Books, Jun. 2009, 20 pages.
Thiagarajan,"VTrack: Accurate, Energy-aware Road Traffic Delay Estimation Using Mobile Phones", Nov. 2009, 14 pages.
Wei,"PATS: A Framework of Pattern-Aware Trajectory Search", IEEE Eleventh International Conference on Mobile Data Management, May 23, 2010, 6 pages.
"Final Office Action", U.S. Appl. No. 13/919,479, Jan. 6, 2017, 16 pages.
"Foreign Notice of Allowance", JP Application No. 2015-529778, Nov. 22, 2016, 4 pages.
"Foreign Office Action", CN Application No. 20128004066.6, Sep. 29, 2016, 6 pages.
"Foreign Office Action", CN Application No. 201380038072.9, Aug. 25, 2016, 9 pages.
"Foreign Office Action", JP Application No. 2014-550338, Nov. 22, 2016, 5 pages.
"Foreign Office Action", TW Application No. 102127829, Nov. 16, 2016, 10 pages.
"Non-Final Office Action", U.S. Appl. No. 15/143,731, Jul. 27, 2016, 18 pages.
"XP User Starting to Use Windows 7", http://download.Microsoft.com/download/A/0/D/A0D4CF2B-9B70-4846-A18D-0765D1F75343/XPUsertoWindows7.pdf, Jun. 13, 2010, 9 pages.
"Non-Final Office Action", U.S. Appl. No. 15/216,552, Mar. 29, 2017, 19 pages.
"Notice of Allowance", U.S. Appl. No. 13/726,043, Mar. 17, 2017, 15 pages.
"Notice of Allowance", U.S. Appl. No. 13/726,043, May 19, 2017, 8 pages.
"Advisory Action", U.S. Appl. No. 13/919,479, May 31, 2017, 6 pages.
"Notice of Allowance", U.S. Appl. No. 15/143,731, Apr. 27, 2017, 7 pages.
"Foreign Office Action", RU Application No. 2015153200, Apr. 25, 2017, 8 pages.
"Foreign Office Action", RU Application No. 2015153190, Aug. 21, 2017, 16 pages.
"Foreign Office Action", JP Application No. 2016-519492, Jun. 27, 2017, 17 pages.

* cited by examiner

COALESCING GEO-FENCE EVENTS

BACKGROUND

As computing technology has advanced, increasingly powerful mobile devices have become available. For example, smart phones have become commonplace. The mobility of such devices has resulted in different types of functionality being developed, such as location-based functionality in which certain actions are taken by the device based on the location of the device. While this functionality has many benefits, it is not without its problems. One such problem is that a program may attempt to be notified of the location of the device more frequently than programs are expected to be notified. This can result in device controls regarding the frequency with which programs are expected to be run being circumvented, which leads to increased power usage and reduced battery life in the device and thus a poor user experience when using the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, the occurrence of one or more geo-fence events for a computing device during a conservation period of an operating system during which certain programs are not scheduled to run is detected. A record of geo-fence events for each of multiple geo-fences is maintained. When a program associated with at least one of the multiple geo-fences is scheduled to run during an execution period of the operating system, an indication of one or more geo-fence events for the at least one of the multiple geo-fences from the record of geo-fence events is provided to the program.

BRIEF DESCRIPTION OF THE DRAWINGS

The same numbers are used throughout the drawings to reference like features.

DETAILED DESCRIPTION

Coalescing geo-fence events is discussed herein. The location of a computing device is determined, and the location of an area of interest is identified. The area of interest is a geographic area that is also referred to as a geo-fence. Multiple geo-fences can be identified by the computing device, and different geo-fences can be associated with different programs on the computing device. An operating system of the computing device implements multiple different periods of operation for the computing device, including a conservation period during which certain programs are not typically scheduled to run, and an execution period during which such programs are typically scheduled to run. A system of the computing device identifies geo-fence events, which occur when the computing device enters or exits the geo-fence. The system maintains a record of the geo-fence events for each of multiple geo-fences, and provides to a program selected ones of those geo-fence events (e.g., the geo-fence events for the most recent entering and exiting of each geo-fence associated with the program) at a time when the program is scheduled to run on the computing device during an execution period of the operating system.

Figure 1:
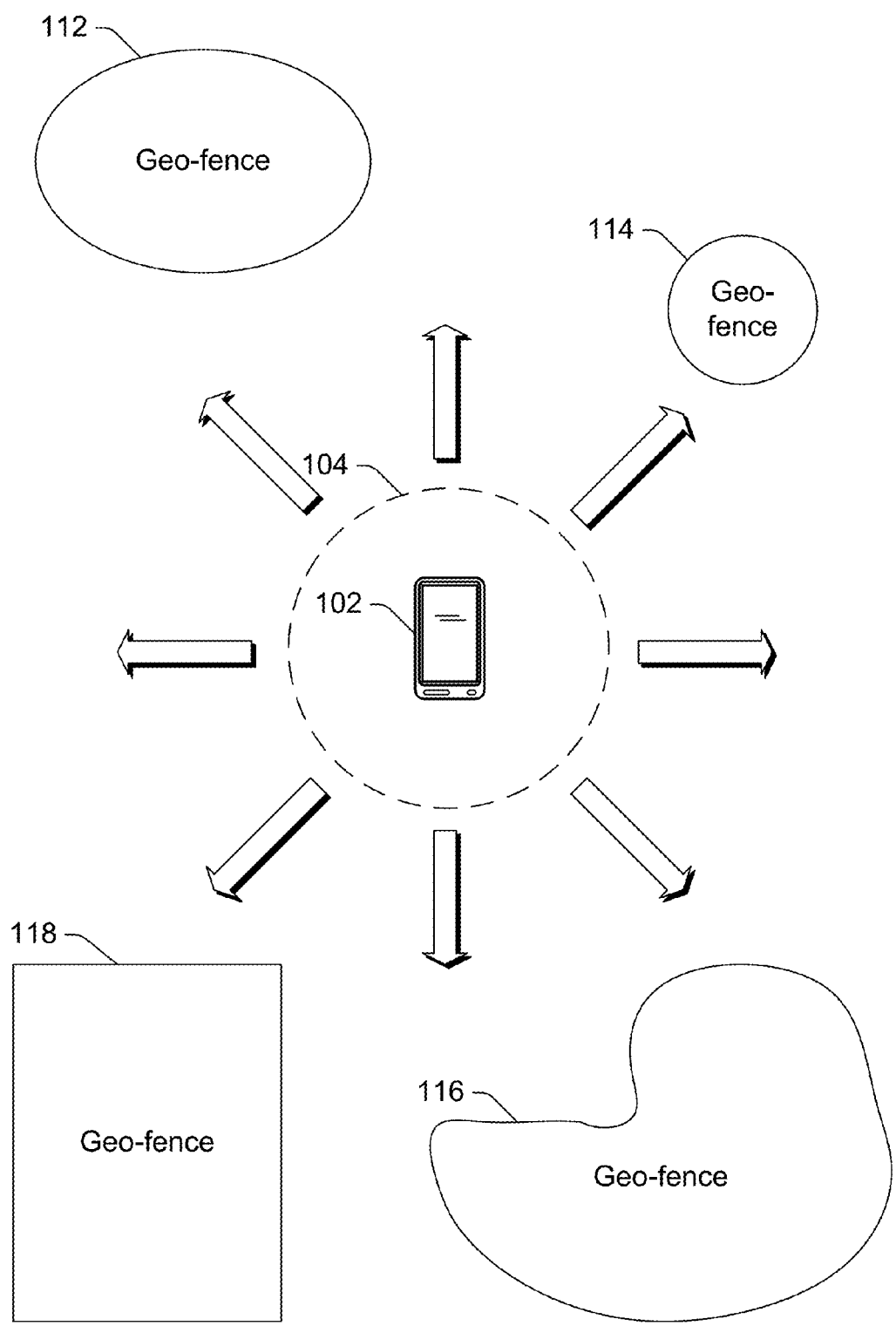
FIG. 1 illustrates an example system in which the coalescing geo-fence events discussed herein can be used.

FIG. 1 illustrates an example system 100 in which the coalescing geo-fence events discussed herein can be used. The system 100 includes a computing device 102, which can be any of a variety of types of devices, although typically is a mobile device. For example, the computing device 102 can be a smart phone or other wireless phone, a laptop or netbook computer, a tablet or notepad computer, a wearable computer, a mobile station, an entertainment appliance, an audio and/or video playback device, a game console, an automotive computer, and so forth. The computing device 102 is typically referred to as being a mobile device because the device 102 is designed or intended to be moved to multiple different locations (e.g., taken by a user with him or her as the user goes to different locations).

The location of the computing device 102 can be determined using any of a variety of different techniques, such as wireless networking (e.g., Wi-Fi) triangulation, cellular positioning, Global Navigation Satellite System (GNSS) positioning, network address (e.g., Internet Protocol (IP) address) positioning, and so forth as discussed in more detail below. Different location determination techniques can have different accuracy errors or associated uncertainties. For example, a location determination technique may be accurate to 10 meters (m) or 10 kilometers (km). The exact position of the computing device 102 is thus not pinpointed, but is illustrated as an area 104 surrounding the computing device 102. The area 104 represents the uncertainty in the determined location or position of the computing device 102, so although the computing device is determined to be at a particular location or position (e.g., approximately the center of the area 104), the computing device 102 may actually be anywhere within the area 104.

The system 100 also illustrates multiple geo-fences 112, 114, 116, and 118. Each geo-fence 112-118 can be any of a variety of different places of interest to the computing device 102, to the user of the computing device 102, to a program running on the computing device 102, and so forth. For example, a geo-fence 112-118 can be the user's home, the user's workplace, restaurants or businesses that may be visited by the user, educational facilities, public services (e.g., hospitals or libraries), geographic places (e.g., cities or states), and so forth.

The location of geo-fences 112-118 is maintained in or otherwise accessible to the computing device 102. It should be noted that different users of the computing device 102 can optionally have different geo-fences maintained or accessed. The computing device 102 is mobile and can enter and exit geo-fences 112-118. At any given time, the computing device 102 can be within one of geo-fences 112-118, or within no geo-fence. If the computing device 102 is determined to be within the area that encompasses a particular geo-fence, then the computing device 102 is referred to as being inside or within that particular geo-fence. However, if the computing device 102 is determined to not be within the area that encompasses a particular geo-fence, then the computing device 102 is referred to as being outside or not within that particular geo-fence. Situations can also arise in which two or more geo-fences overlap, in which case the computing device 102 can be within two or more geo-fences 112-118 at one time. It should be noted that the illustration of FIG. 1 is not to scale, and that geo-fences 112-118 can be, and typically are, significantly larger in size than the computing device 102.

In the illustrated example, the area 104 does not intersect any of the geo-fences 112-118, and thus the computing device 102 is outside each of the geo-fences 112-118. However, if the area 104 were to at least partially overlap one of the geo-fences 112-118, then the computing device 102 is possibly inside the geo-fence that is overlapped. Whether the computing device 102 is determined to be inside the geo-fence or outside the geo-fence in such situations can be determined in various manners, such as based on the presence of an overlap, how much of the geo-fences overlap, and so forth.

Figure 2:
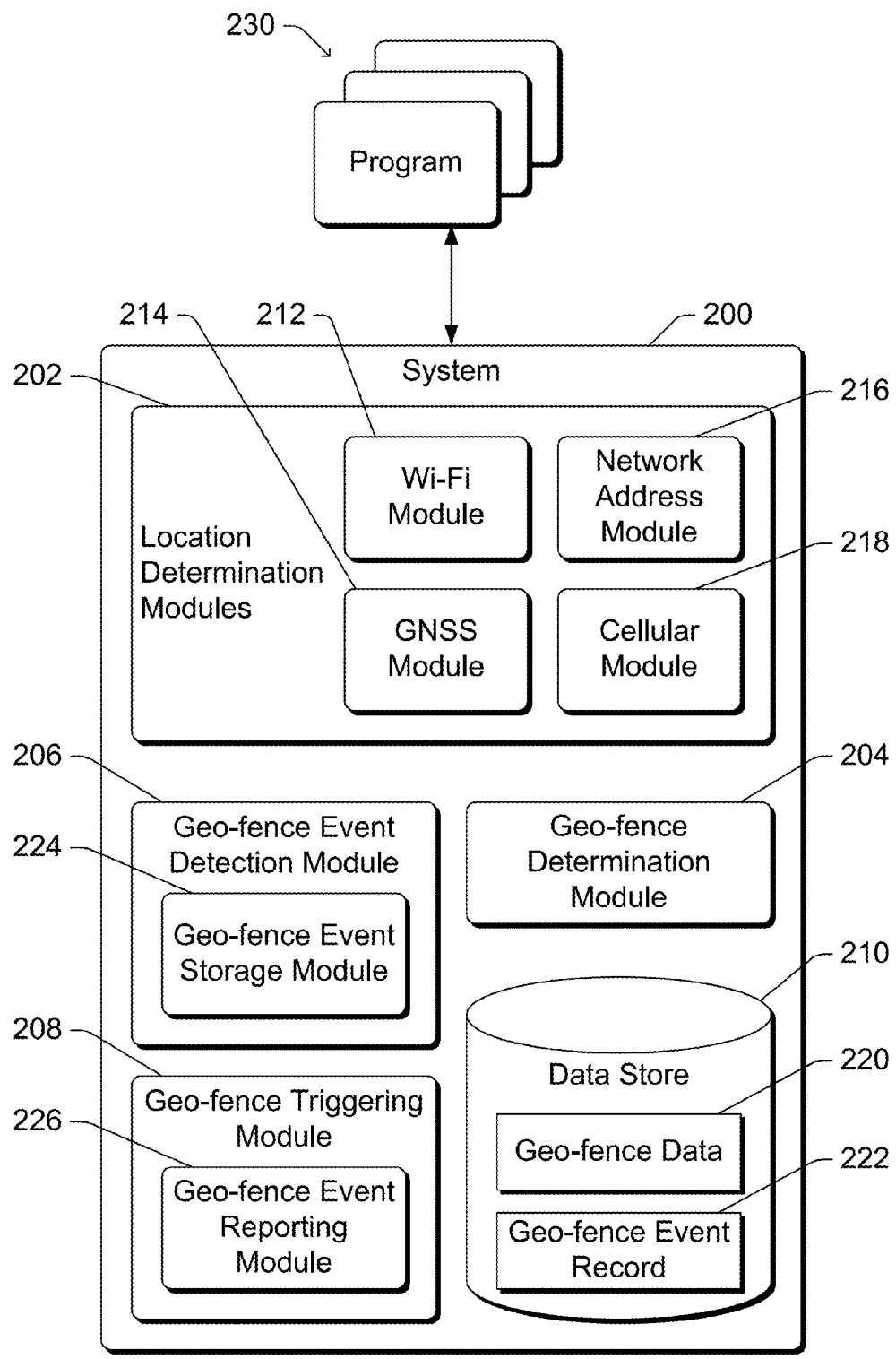
FIG. 2 is a block diagram illustrating an example system implementing the coalescing geo-fence events in accordance with one or more embodiments.

FIG. 2 is a block diagram illustrating an example system 200 implementing the coalescing geo-fence events in accordance with one or more embodiments. The system 200 can be implemented by a single device such as the computing device 102 of FIG. 1, or alternatively multiple devices such as the computing device 102 and one or more server computers accessed via a network (e.g., a cellular or other wireless phone network, the Internet, etc.). The system 200 includes one or more location determination modules 202, a geo-fence determination module 204, a geo-fence event detection module 206, a geo-fence triggering module 208, and a data store 210.

The data store 210 maintains various data used by the techniques discussed herein. The data store 210 can be implemented using any of a variety of different storage devices, such as system memory (e.g., random access memory (RAM)), Flash memory or other solid state memory, magnetic disks, optical discs, and so forth. The data maintained in the data store 210 identifies multiple geo-fences, including geo-fence data 220 for each of multiple geo-fences. Geo-fence data 220 can be obtained from various sources, such as from a distributer or reseller of the data store 210 that stores the data on the data store 210, from a program running on a computing device implementing the system 200, from another device or service, and so forth. The geo-fence data for a geo-fence describes the boundary of the geo-fence, as well as the criteria to be satisfied in order for the geo-fence to be triggered.

The criteria to be satisfied can refer to a device entering the geo-fence, exiting the geo-fence, staying within the geo-fence for a particular amount of time (e.g., at least a threshold amount of time, no more than a threshold amount of time, etc.), a time period for the geo-fence (e.g., a start time and end time, a start time and a duration), combinations thereof, and so forth. Various additional criteria can optionally be included as well, such as system state to be satisfied. For example, the criteria can include whether the display of the computing device is turned on or off, whether the computing device has network connectivity (e.g., Internet connectivity), a power state of the computing device (e.g., whether the computing device has at least a threshold amount of battery life remaining), and so forth.

One or more actions that are taken in response to the geo-fence being triggered (the criteria being satisfied) can also be included as part of the geo-fence data. Any of a variety of actions can be taken when a geo-fence is triggered, such as a particular program being notified, particular content being displayed or otherwise played back by the computing device, the geo-fence data being deleted from the data store 210, combinations thereof, and so forth. Multiple different actions can be taken based on the manner in which the geo-fence is triggered, such as one action taken in response to the device entering the geo-fence, and another action taken in response to the device exiting the geo-fence.

The boundary of the geo-fence can be specified in any of a variety of different manners. For example, the geo-fence can be specified as a position (e.g., latitude and longitude coordinates) and a radius, as a set of positions (e.g., latitude and longitude coordinates of corners of the geo-fence), as a series of vectors, and so forth. In the discussions herein, reference is made to the geo-fences being approximately circular in shape. However, it should be noted that the geo-fences can be any of a variety of regular geometric shapes (e.g., triangles, rectangles, octagons, and so forth), other geometric shapes (e.g., freeform shapes or blobs), and so forth.

The data store 210 is illustrated in FIG. 2 as being part of the system 200. It should be noted that the data maintained in the data store 210 can be obtained from the programs 230 (e.g., from the programs 230 as they are loaded in a computing device implementing the system 200). Alternatively, one or more of the programs 230 can include a data store that is used in addition to, or in place of, the data store 210.

The geo-fences can be used in a variety of different manners. For example, a geo-fence and action to be taken can be to alert a user of a computing device implementing at least part of the system 200 when they are approaching a bus stop, to give the user a coupon when they enter a shopping mall or store, to notify a parent when their child has left school or entered their home, to display weather information for a current location when the user travels to a different city, and so forth.

The data maintained in the data store 210 can also include additional data used with the techniques discussed herein. For example, the data store 210 can include a record of geo-fence events 222, which are geo-fence events detected by the geo-fence event detection module 206 as discussed in more detail below.

The location determination modules 202 include one or more modules that determine the location of the computing device 102. In the illustrated example, the location determination modules 202 include a Wi-Fi module 212, a GNSS module 214, a network address module 216, and a cellular module 218. It should be noted, however, that these modules 212-218 are examples and that the location determination modules 202 need not include each of the modules 212-218 and/or that the location determination modules 202 can include one or more additional modules that determine a location of the computing device 102 in different manners. For example, the location determination modules can include MEMS (Microelectromechanical systems), cameras, microphones, and so forth.

The Wi-Fi module 212 uses Wi-Fi signals, such as triangulation of Wi-Fi signals, to determine the location of the computing device 102. The Wi-Fi module 212 can receive signals from various wireless access points, including an identifier of a particular wireless access point and/or a particular wireless network from which a signal is received. For example, a wireless access point may send a media access control (MAC) address of the wireless access point, a basic service set identifier (BSSID) of a wireless network supported by the wireless access point, and so forth. The Wi-Fi module 212 can also measure a strength (e.g., received signal strength indicator (RSSI) values) of these received signals. It should be noted that the Wi-Fi module 212 can, at any given time for any given position of the computing device, receive signals from multiple wireless access points. The Wi-Fi module 212 can maintain or otherwise access a record of wireless access points, signal strengths, and corresponding locations to determine the location of the computing device at any particular time given the wireless access points from which signals are received and the strength of those signals at the particular given time. Alternatively, the Wi-Fi module 212 can provide an indication of the wireless access points from which signals are received and the strength of those signals at a particular given time to a remote service (e.g., accessed via any of a variety of different types of networks) that determines and returns to the Wi-Fi module 212 an indication of the location of the computing device at that particular given time.

The GNSS module 214 uses GNSS positioning to determine the location of the computing device 102, determining a location of the computing device based on a particular number of satellites (e.g., four or more satellites) from which the GNSS module 214 can receive signals or otherwise communicate. The GNSS module 214 can implement the GNSS functionality using a variety of different technologies, including but not limited to the Global Positioning System (GPS), the Global Navigation Satellite System (GLONASS), the BeiDou (or Compass) navigation system, the Galileo positioning system, combinations thereof, and so forth. The GNSS module 214 operates in any of a variety of public and/or proprietary manners to determine, given the one or more satellites from which the GNSS module 214 can receive signals or otherwise communicate at any particular given time, the location of the computing device at that particular given time.

The network address module 216 uses network address positioning to determine the location of the computing device 102. The network address used can be any of a variety of network addresses, such as the IP address of the computing device. The network address module 216 can maintain or otherwise access a record of IP addresses or address ranges and corresponding locations to determine the location of the computing device at any particular time given the IP address assigned to the computing device at the particular given time. Alternatively, the network address module 216 can provide an indication of the IP address of the computing device at a particular given time to a remote service (e.g., accessed via any of a variety of different types of networks) that determines and returns to the network address module 216 an indication of the location of the computing device at that particular given time.

The cellular module 218 uses cellular positioning to determine the location of the computing device 102. The cellular module 218 can receive signals from various cell transceivers, including an identifier of a particular cell transceiver (e.g., a cell tower or transceiver identifier) from which a signal is received. The cellular module 218 can also measure a strength of these received signals. It should be noted that the cellular module 218 can, at any given time for any given position of the computing device, receive signals from multiple cell transceivers. The cellular module 218 can maintain or otherwise access a record of cell transceivers, signal strengths, and corresponding locations to determine the location of the computing device at any particular time given the cell transceivers from which signals are received and the strength of those signals at the particular given time. Alternatively, the cellular module 218 can provide an indication of the transceivers from which signals are received and the strength of those signals at a particular given time to a remote service (e.g., accessed via any of a variety of different types of networks) that determines and returns to the cellular module 218 an indication of the location of the computing device at that particular given time. Additionally or alternatively, the cellular module 218 can monitor state changes at low power and provide notifications (e.g., to the geo-fence event detection module 206), allowing movement detections at low power without requiring continuous polling.

The locations determined by the location determination modules 202 are typically latitude and longitude coordinates, although the location can alternatively be specified in other manners. Each of the location determination modules 202 has an associated uncertainty in the location that it determines, also referred to as an accuracy error or estimated accuracy error of the location. The amount of this uncertainty can be determined in various manners, such as being reported by the location determination module itself, being pre-configured in or otherwise accessible to other modules of the system 200 (e.g., the geo-fence event detection module 206), and so forth. The uncertainty results in a position uncertainty area for the location determined by a location determination module, the position uncertainty area being an area within which the computing device 102 may actually be for the determined location. In one or more embodiments, the position uncertainty area is an approximately circular area with the location determined by the location determination module being approximately the center of the circular area, and the radius of the approximately circular area being an error radius determined as the uncertainty for the location determination module. Alternatively, the position uncertainty area can be described using various other regular or other geometric shapes. Thus, a position uncertainty area for a location determination module can be a spatial error distribution function. An approximation of the spatial error distribution function can be a flat distribution over an area, although various other approximations or descriptions of the spatial error distribution function can alternatively be used.

In one more embodiments, a location is determined by the location determination modules 202 only after receiving user consent to do so. This user consent can be an opt-in consent, where the user takes an affirmative action to request that the location be determined by the location determination modules 202 before any such location is determined. Alternatively, this user consent can be an opt-out consent, where the user takes an affirmative action to request that the location not be determined by the location determination modules 202. If the user does not choose to opt out of determining the location, then it is an implied consent by the user to determine his or her location. Furthermore, it should be noted that the location determined by the location determination modules 202 can be maintained in a computing device receiving the determined location (e.g., the computing device 102 of FIG. 1) and need not be communicated to other devices or services.

Alternatively, user consent may be granted for specific programs and revoked for other programs. In this case, location information will be determined only when the user has consented for at least one program for which geo-fence tracking is used. The location information is used to determine the entry and/or exit of only those geo-fences belonging to the consented programs. Remaining geo-fences from the unapproved programs are not tracked.

Figure 3:
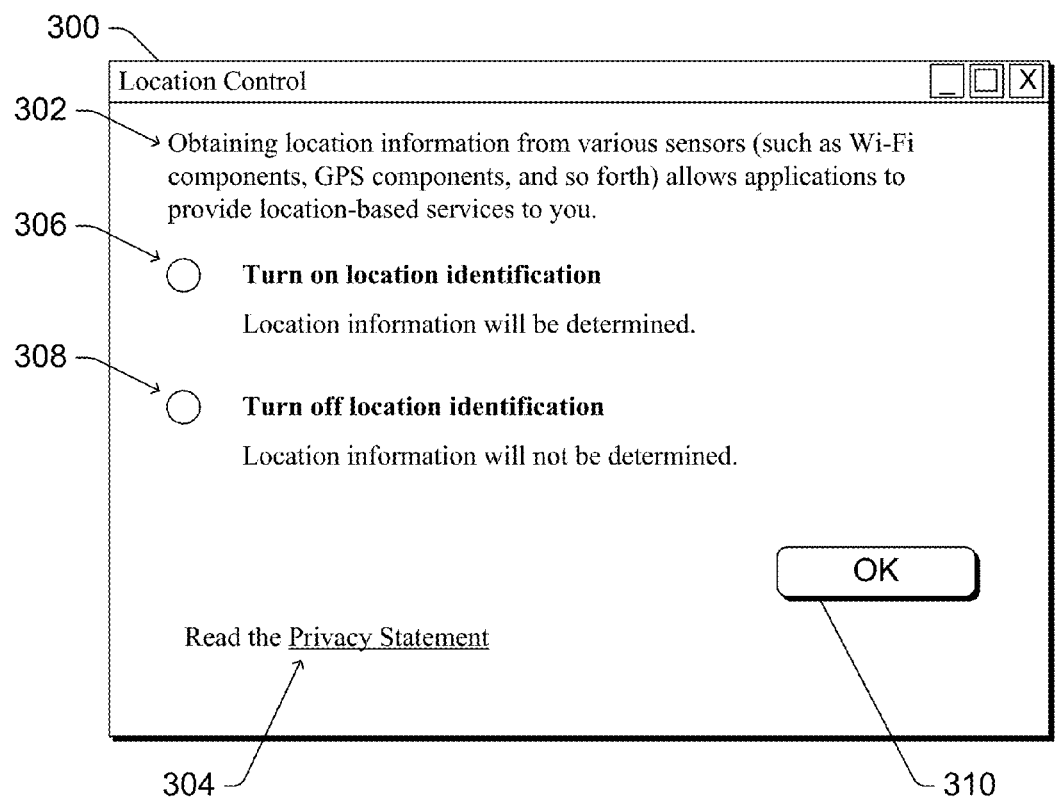
FIG. 3 illustrates an example user interface that can be displayed to a user to allow the user to select whether locations are to be determined in accordance with one or more embodiments.

FIG. 3 illustrates an example user interface that can be displayed to a user to allow the user to select whether locations are to be determined in accordance with one or more embodiments. A location control window 300 is displayed including a description 302 explaining to the user why the location information is being determined. A link 304 to a privacy statement is also displayed. If the user selects the link 304, a privacy statement of the system 200 is displayed, explaining to the user how the user's information is kept confidential.

Additionally, the user is able to select a radio button 306 to opt-in to the determining of location information, or a radio button 308 to opt-out of the determining of location information. Once a radio button 306 or 308 is selected, the user can select an "OK" button 310 to have the selection saved. It is to be appreciated that radio buttons and an "OK" button are only examples of user interfaces that can be presented to a user to opt-in or opt-out of the determining of location information, and that a variety of other conventional user interface techniques can alternatively be used. The system 200 of FIG. 2 then proceeds to determine the location of the computing device, or not determine the location of the computing device, in accordance with the user's selection.

Returning to FIG. 2, the geo-fence determination module 204 determines one or more of the geo-fences identified in the data store 210 for which a determination is to be made as to whether the geo-fence is triggered. Data for numerous different geo-fences can be maintained in the data store 210, and one or more of those geo-fences is selected by the geo-fence determination module 204. The geo-fence determination module 204 can make this determination in a variety of different manners, such as based on a current distance between the geo-fences and the computing device, based on sizes of (areas encompassed by) the geo-fences, based on which geo-fence is most (or nearly most) stringent as discussed in more detail below, and so forth. The one or more geo-fences that are determined by the module 204 are those deemed more likely to be entered or exited based on various criteria, such as the current location of the computing device, and those one or more geo-fences can be the focus of the module 204 until the criteria changes. However, it should be noted that the geo-fence determination module 204 can determine whether a geo-fence is triggered for any of the geo-fences in the data store 210.

The geo-fence event detection module 206 obtains a current location of the computing device at regular or irregular intervals, and detects whether a geo-fence event occurs. These intervals can be selected dynamically based on current conditions (e.g., approximate distance to a closest geo-fence, power budget for the computing device, an estimated speed of movement of the computing device, and so forth). A geo-fence event refers to the device entering the geo-fence, exiting the geo-fence, or staying in the geo-fence for a particular amount of time (e.g., being in the geo-fence and not exiting the geo-fence). The geo-fence event detection module 206 can evaluate the uncertainty associated with the determined location relative to the size of the geo-fence in order to determine whether the computing device is inside the geo-fence or outside the geo-fence. Alternatively, the geo-fence event detection module 206 can use the location determined by a location determination module to determine whether the computing device is inside the geo-fence or outside the geo-fence without regard for the uncertainty associated with the determined location. The geo-fence event detection module 206 can also track whether the computing device is inside or outside the geo-fence over time, and thus knows whether the computing device has moved from inside the geo-fence to outside the geo-fence, whether the computing device has moved outside the geo-fence to inside the geo-fence, an amount of time that the computing device has been inside the geo-fence, and so forth.

The geo-fence detection module 206 includes a geo-fence event storage module 224, and in response to a geo-fence event being detected by the module 206, the geo-fence event storage module 224 stores the detected geo-fence event in the geo-fence event record 222. The geo-fence event record 222 can be implemented in a variety of different manners, such as a database, a list of geo-fence events per geo-fence, and so forth. Storing the detected geo-fence event refers to storing data identifying the geo-fence event and optionally various aspects of the geo-fence event. The data stored for the detected geo-fence event can include an indication of whether the geo-fence event is entering a geo-fence or exiting a geo-fence, an indication of (e.g., identifier of) the geo-fence entered or exited, a duration that the computing device was in (or has been in) a geo-fence, a program associated with the geo-fence (e.g., a program to be notified of the geo-fence event), a timestamp (e.g., date and/or time) of when the geo-fence event was detected, and so forth. The stored data can also identify the geo-fence for which the geo-fence event is detected, or the geo-fence events can be stored in a manner in which the identification of the geo-fence for which the geo-fence event is detected is inherent (e.g., the geo-fence events can be added to a list for the geo-fence, each geo-fence having a different list). The duration that the computing device was in or has been in a geo-fence can be determined in different manners, such as by the geo-fence event detection module 206 monitoring how long it has been since a geo-fence was entered, by determining the time that has elapsed since the last geo-fence event entering the geo-fence was detected (or the time that elapsed between the most recent geo-fence event exiting the geo-fence was detected and the preceding geo-fence event entering the geo-fence was detected), and so forth.

In one or more embodiments, each geo-fence event detected by the geo-fence event detection module 206 is stored in the data store 210, for example in an ordered list sorted by the time of occurrence of the geo-fence event. The geo-fence event record 222 can include geo-fence events for different durations, such as the past 24 hours, the past week, and so forth. Alternatively, the geo-fence event record 222 can include, for each geo-fence event, the most recent geo-fence event exiting the geo-fence and the most recent geo-fence event entering the geo-fence. Each time a new geo-fence event is detected for a geo-fence, the previously recorded geo-fence event of the same type (exiting or entering the geo-fence) can be replaced by the newly detected geo-fence event. Thus, in some embodiments only the most recent geo-fence event exiting the geo-fence and the most recent geo-fence event entering the geo-fence for a geo-fence are recorded, while in other embodiments multiple geo-fence entering and exiting events are recorded for a geo-fence (e.g., all geo-fence entering and exiting events are recorded). The recorded geo-fence events for a geo-fence may also be removed from the data store 210 in response to various events, such as the application that provided the geo-fence data for the geo-fence being uninstalled or otherwise removed from the system 200).

The geo-fence triggering module 208 analyzes the criteria associated with a geo-fence and determines whether the criteria are satisfied. This determination is made based at least in part on the occurrence of one or more geo-fence events as determined by the geo-fence event detection module 206. In response to the criteria being satisfied, the module 208 determines that the geo-fence is triggered and takes the appropriate action. The action taken can be associated with geo-fence data for the triggered geo-fence stored in the data store 210, or can be determined in other manners such as being pre-configured in the geo-fence triggering module 208, being obtained from another module or device, and so forth.

In one or more embodiments, the action taken by the geo-fence triggering module 208 in response to the geofence being triggered is to notify one or more programs 230 that the geo-fence was triggered. The one or more programs 230 can include various different types of programs, such as applications, operating system modules or components, and so forth. The one or more programs 230 to be notified (also referred to as the programs 230 associated with the triggered geo-fence) can be identified in different manners, such as being configured in the geo-fence triggering module 208, being identified as part of the geo-fence data for the geo-fence in the data store 210, being obtained from another module or service, and so forth. A program 230 can be notified of the geo-fence event that occurred, as well as optionally additional information (e.g., that the computing device was within a geo-fence for at least a threshold amount of time). The program 230 can then take the action it desires based on the geo-fence being triggered.

The geo-fence triggering module 208 includes a geo-fence event reporting module 226 that manages notifying programs that a geo-fence was triggered. The geo-fence event reporting module 226 selects one or more geo-fence events from geo-fence event record 222, such as for each geo-fence associated with a program 230 the most recent geo-fence exit event (the most recent geo-fence event that is exiting the geo-fence) and the most recent geo-fence enter event (the most recent geo-fence event that is entering the geo-fence). The geo-fence event reporting module 226 coalesces geo-fence events for each geo-fence associated with a program 230, and provides to the program 230 a collection of geo-fence events for geo-fences associated with the program 230.

In one or more embodiments, a geo-fence is triggered in response to a geo-fence event (entering or exiting the geo-fence), and the geo-fence event reporting module 226 notifies the program of that geo-fence event. Alternatively, the geo-fence event reporting module 226 can take into account other criteria associated with the geo-fence in determining whether to notify the program of the geo-fence event, and notify the program only if such additional criteria are satisfied. For example, if the criteria indicates that Internet connectivity is desired but no Internet access is currently available, then the geo-fence reporting module 226 would not notify the program of the geo-fence event. This other criteria can be stored as part of the geo-fence event record 222 and/or geo-fence data 220.

Furthermore, the geo-fence event reporting module 226 can take into account any criteria associated with the program itself. For example, if the criteria indicates that the program to be notified is not to run during certain times of the day, then the geo-fence reporting module 226 would not notify the program of the geo-fence event if it happens during those certain times of the day.

Additionally, situations can arise where the geo-fence event reporting module 226 does not notify the program 230 about certain geo-fence events, such as automatic expiration of a geo-fence. For example, if a geo-fence is valid only for a specific time period (e.g., a daily deal for a store that closes at 9 pm), then the geo-fence can be automatically removed from the system 200 once it expires, and the program 230 associated with the geo-fence may not be notified of this removal event.

In one or more embodiments, the program 230 that is associated with a geo-fence is a program on the computing device implementing the system 200. An operating system of the computing device implementing the system 200 implements multiple different periods of operation for the computing device. These multiple different periods of operation include a conservation period in which the computing device is operating in a power saving mode. During the conservation period, certain programs (such as applications other than operating system programs) are not typically scheduled to run and various other power saving techniques can be employed by the operating system to reduce power usage of the computing device. The multiple different periods of operation also include an execution period in which the computing device is operating in an execution mode. During the execution period, programs that are not typically scheduled during the conservation period are scheduled to run by a scheduling mechanism of the operating system. The scheduling mechanism can take into account various different factors to determine which program is to run and how long the program is to run, such as how recently the program was last scheduled to run, how long the program ran the last time the program was scheduled to run (or over some past time duration), other programs to be scheduled, available power (e.g., remaining battery life) of the computing device, whether a user request to run the program is received, and so forth. It should be noted that the scheduling mechanism operates independently of the system 200—the scheduling mechanism can take into account whether geo-fence events have been detected for a program in determining when to schedule the program, but the scheduling mechanism need not (and typically does not) schedule a program to run simply in response to a geo-fence event associated with the program being detected.

Figure 4:
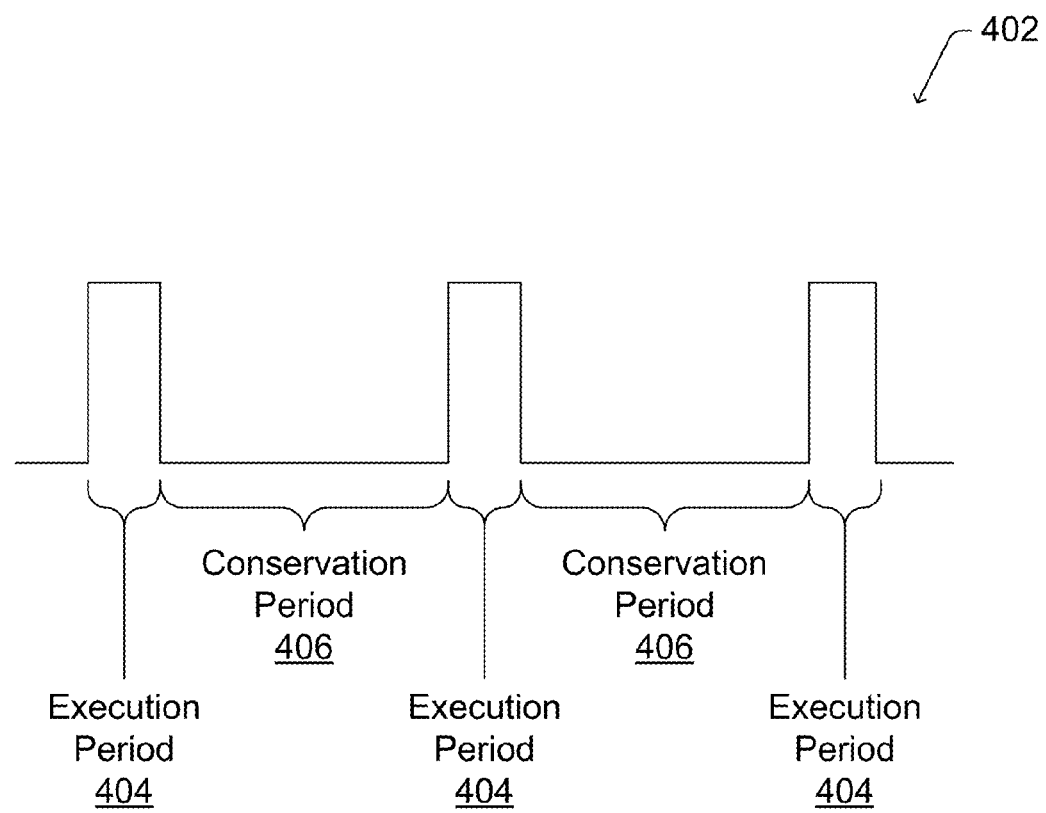
FIG. 4 illustrates an example of different periods of operation in accordance with one or more embodiments.

FIG. 4 illustrates an example of different periods of operation in accordance with one or more embodiments. A timeline 402 is illustrated including interspersed execution periods 404 and conservation periods 406. During execution periods 404 the operating system is operating in the execution mode, and during conservation periods 406 the operating system is operating in the power saving mode. Although illustrated as having the same time duration, it should be noted that different execution periods 404 can have different durations and that different conservation periods 406 can have different durations. These durations of the execution periods 404 and/or conservation periods 406 can vary over time during operation of the computing device.

Returning to FIG. 2, the geo-fence event reporting module 226 coalesces geo-fence events for each geo-fence associated with a program 230, and provides to the program 230 a collection of geo-fence events for geo-fences associated with the program 230 when the program 230 is later scheduled to run. The collection of geo-fence events (e.g., sorted chronologically starting with most recent event) can be provided to the program 230 the next time that the program 230 is scheduled to run, or alternatively a subsequent time.

The times when the program 230 is scheduled to run can be controlled by the scheduling mechanism of the operating system, and may be in the next execution period or some later execution period. It should be noted that during both execution and conservation periods, the geo-fence event detection module 206 operates to detect geo-fence events and the geo-fence event storage module 224 stores the detected geo-fence events in the geo-fence event record 222. Thus, even though a program 230 that is to be notified of the detected geo-fence events is not running or is not scheduled to run (or the operating system is in the conservation period), geo-fence events for geo-fences associated with the program are still being detected and recorded, and can be provided to the program 230 when the program 230 is later run. Once the geo-fence events are received by the program 230, they can be subsequently removed from the data store 210.

Although illustrated as modules separate from the location determination modules 202, it should be noted that one or more of the modules 204-208 can alternatively be implemented at least in part in one of the location determination modules 202. For example, at least part of one or more of the modules 204-208 can be implemented in hardware components of the GNSS module 214 or the Wi-Fi module 212.

Figure 5:
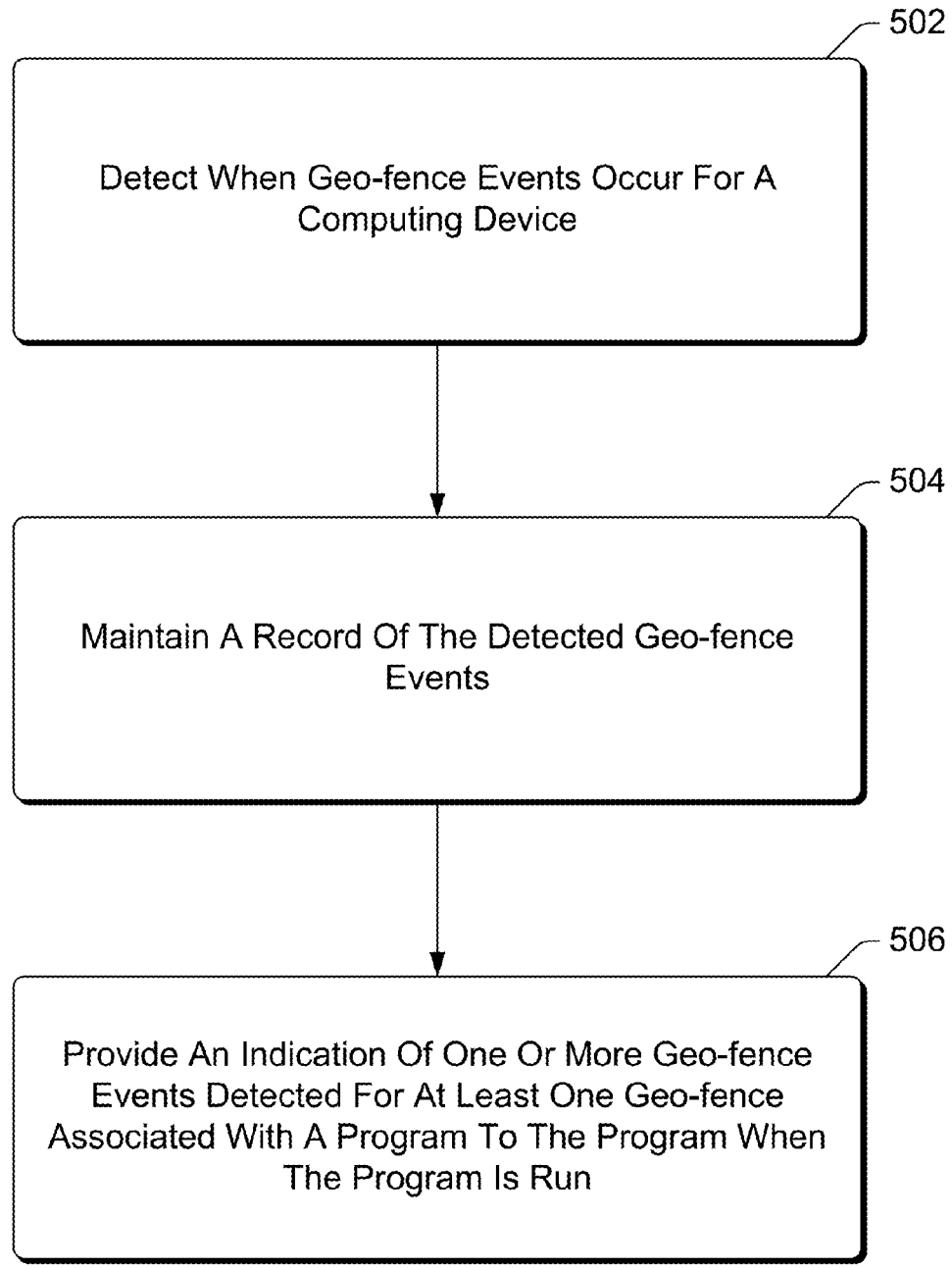
FIG. 5 is a flowchart illustrating an example process for coalescing geo-fence events in accordance with one or more embodiments.

FIG. 5 is a flowchart illustrating an example process 500 for coalescing geo-fence events in accordance with one or more embodiments. The process 500 is carried out by a system, such as the system 200 of FIG. 2, and can be implemented in software, firmware, hardware, or combinations thereof. The process 500 is shown as a set of acts and is not limited to the order shown for performing the operations of the various acts. The process 500 is an example process for coalescing geo-fence events; additional discussions of coalescing geo-fence events are included herein with reference to different figures.

In process 500, geo-fence event occurrences for a computing device are detected (act 502). The occurrence of a geo-fence event is based on the location of the computing device as determined by one or more of the location determination modules 202 of FIG. 2, and the locations of the various geo-fences is identified in the geo-fence data in the data store 210.

A record of the detected geo-fence events is maintained (act 504). The record of detected geo-fence events that is maintained can include various information identifying the geo-fence event and optionally various aspects of the geo-fence event as discussed above.

An indication of one or more geo-fence events detected for at least one geo-fence associated with a program are provided to the program when the program is run (act 506), and the program can then perform various operations based on the indicated geo-fences as the program desires. The indication of the one or more geo-fence events can take various forms, such as the information identifying the geo-fence event and various aspects of the geo-fence event that is maintained in the data store 210 of FIG. 2, an identifier of a location in the data store 210 where the information identifying the geo-fence event is stored, and so forth. The indication can be provided to the program using various mechanisms, such as the program requesting geo-fence events from the system 200 of FIG. 2, the system 200 automatically notifying the program of the geo-fence events (e.g., by invoking an application programming interface of the program or other callback function), and so forth.

The time when the program is run in act 506 is determined by a scheduling mechanism of the operating system as discussed above. It should be noted that the program can be waiting to be scheduled or not running at all when the geo-fence events are detected. The detected geo-fence events are provided to the program in act 506 (e.g., immediately) if the program is already running, or are provided to the program in act 506 the next time the program runs. The next time the program runs may be determined in different manners. For example, the program may be run when activated by a user, or when determined by a scheduling mechanism of the operating system. If multiple instances of the same program are run at the same time, only one instance of the program can be provided with the geo-fence events to avoid duplication of event delivery and the resultant duplicate action from the program on receipt of a particular geo-fence event. In one or more embodiments, the one or more geo-fence events are the most recent geo-fence enter event and the most recent geo-fence exit event for each geo-fence associated with the program (or at least each geo-fence associated with the program for which geo-fence events are detected).

Thus, the geo-fence events for multiple geo-fences associated with a program are coalesced and provided to the program as an ordered collection of geo-fence events in act 506. Furthermore, by providing the geo-fence events to the program when the program is run based on the scheduling mechanism of the operating system, the providing of the geo-fence events to the program is harmonized with the scheduling mechanism of the operating system. Mechanisms to provide geo-fence events to the program separate from the scheduling mechanism are not employed, preventing the scheduling mechanism from being circumvented and preventing conservation periods from being interrupted due to detected geo-fence events.

The techniques discussed herein thus support use of geo-fences in a manner that conserves power and prevents abuse by various programs. By coalescing geo-fence events and harmonizing the geo-fence events with the scheduling mechanism of the operating system, the scheduling mechanism of the operating system cannot be circumvented by a program having numerous geo-fences that are triggered. The techniques also provide a most recent geo-fence enter and geo-fence exit event to a program, providing current geographically relevant information to the program.

Although particular functionality is discussed herein with reference to particular modules, it should be noted that the functionality of individual modules discussed herein can be separated into multiple modules, and/or at least some functionality of multiple modules can be combined into a single module. Furthermore, it should be noted that a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
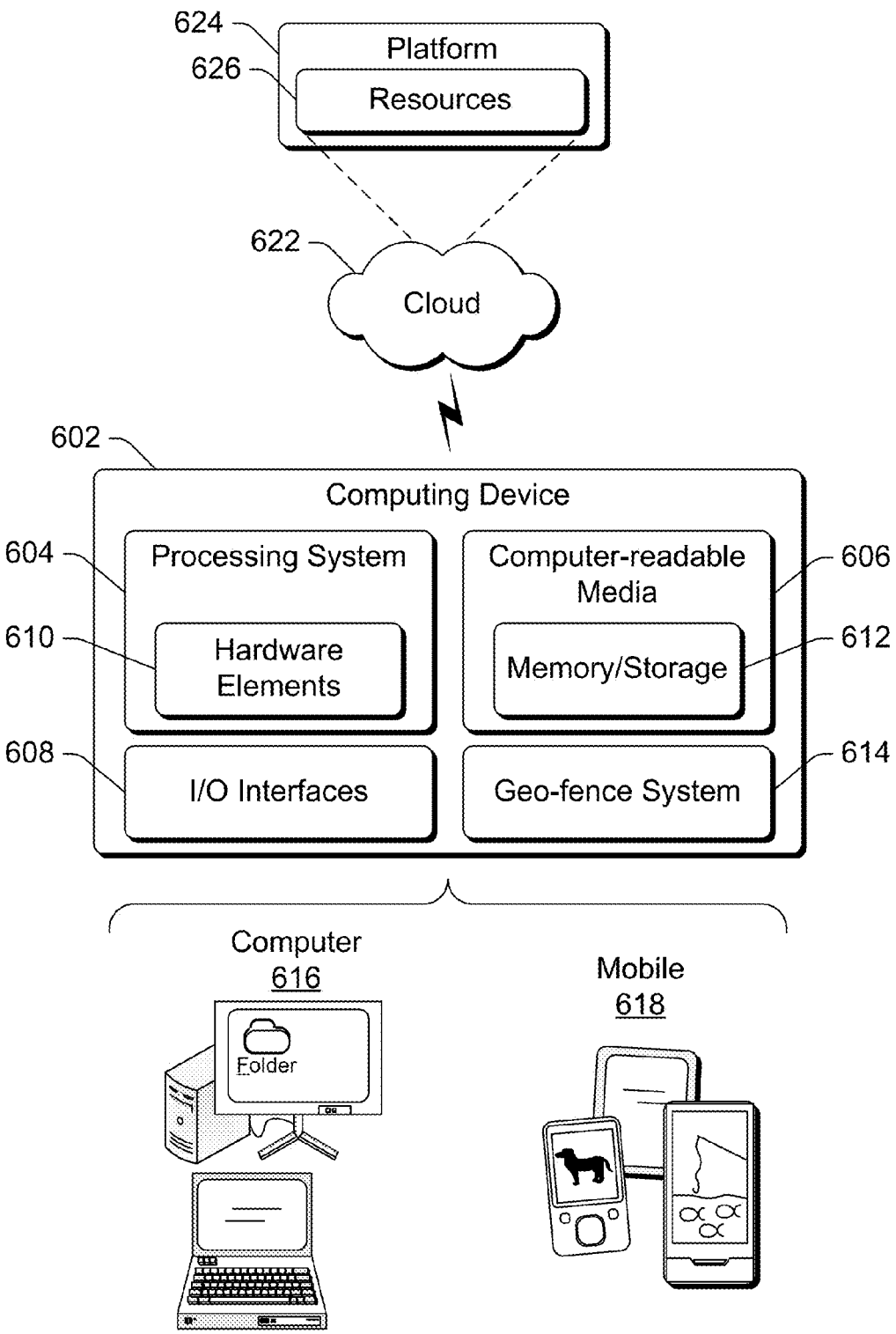
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Computing device 602 also includes a geo-fence system 614. Geo-fence system 614 provides various geo-fence functionality, including coalescing geo-fence, as discussed above. Geo-fence system 614 can implement, for example, the system 200 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a mobile device, and/or other devices. Services and applications run substantially similar in these environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616 or mobile 618 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on. The computing device 602 may also be implemented as the mobile 618 class of device that includes mobile devices, such as a mobile phone, portable music player, portable gaming device, a tablet computer, a wearable device, a multi-screen computer, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   detecting when one or more geo-fence events occur for a computing device during a conservation period of an operating system during which certain programs are not scheduled to run;
   maintaining a record of geo-fence events for each of multiple geo-fences;
   collecting geo-fence events for each of the multiple geo-fences together for each of the certain programs;
   waiting until a program associated with at least one of the multiple geo-fences is scheduled to run during an execution period of the operating system;
   providing to the program, after the waiting, the collected geo-fence events for the program; and
   deleting from the record of geo-fence events a particular geo-fence event based on a time period expiring.

2. A method as recited in claim 1, the certain programs comprising applications other than operating system programs.

3. A method as recited in claim 1, the providing comprising for each of the multiple geo-fences, providing only a most recent geo-fence exit event and/or a most recent geo-fence enter event.

4. A method as recited in claim 3, the maintaining comprising maintaining a record of multiple geo-fence exit events and multiple geo-fence enter events for each of the multiple geo-fences.

5. A method as recited in claim 1, the maintaining comprising recording the geo-fence events for a geo-fence regardless of whether the program associated with the geo-fence is running.

6. A method as recited in claim 1, further comprising deleting one of the multiple geo-fences associated with the program without notifying the program to delete the one of the multiple geo-fences.

7. A method as recited in claim 1, the record of geo-fence events including, for each geo-fence event, an identification of the geo-fence event and a timestamp of when the geo-fence event was detected.

8. A method as recited in claim 1, the providing comprising providing collected geo-fence events to the program by coalescing one or more geo-fence events for multiple geo-fences associated with the program.

9. A method as recited in claim 1, the providing comprising providing collected geo-fence events to the program only if one or more additional criteria associated with the geo-fence or the program are satisfied.

10. A method as recited in claim 9, the additional criteria comprising network connectivity being available.

11. A computing device comprising:
   one or more processors;
   a data store to store geo-fence data for multiple geo-fences, the geo-fence data for a geo-fence including an indication of a program associated with the geo-fence; and
   one or more computer-readable storage devices comprising computer-readable instructions which, when executed by the one or more processors, implement:
      a geo-fence event detection module to detect when one or more geo-fence events occur for the multiple geo-fences, including when one or more geo-fence events occur during a conservation period of an operating system during which certain programs are not scheduled to run;
      a geo-fence event storage module to maintain a record of the detected one or more geo-fence events; and
      a geo-fence event reporting module that waits to provide, to a program subsequently scheduled to run during an execution period of the operating system, an indication of one or more geo-fence events included in the record of the detected one or more geo-fence events until the operating system enters the execution period.

12. A computing device as recited in claim 11, the certain programs comprising applications other than operating system programs.

13. A computing device as recited in claim 11, the program being subsequently scheduled to run in a next execution period of the operating system.

14. A computing device as recited in claim 11, wherein to provide the indication is to provide for each of the multiple geo-fences, only a most recent geo-fence exit event and/or geo-fence enter event.

15. A computing device as recited in claim 11, wherein the record is a record of detected geo-fence events for a geo-fence regardless of whether the program associated with the geo-fence is running.

16. A computing device as recited in claim 11, the record of geo-fence events including, for each geo-fence, an identification of the geo-fence event and a timestamp of when the geo-fence event was detected.

17. A computing device as recited in claim 11, wherein the indication is an indication of one or more geo-fence events provided to the program by coalescing one or more geo-fence events for multiple geo-fences.

18. A computing device as recited in claim 11, wherein the indication is an indication of a geo-fence event provided to the program only if one or more additional criteria associated with the geo-fence are satisfied.

19. A computing device as recited in claim 11, further comprising deleting from the record of geo-fence events a particular geo-fence event based on the program associated with the geo-fence being uninstalled from the computing device.

20. A method comprising:
   detecting when one or more geo-fence events occur for a computing device during a conservation period of an operating system during which certain programs are not scheduled to run;
   maintaining a record of geo-fence events for each of multiple geo-fences, including maintaining a record of multiple geo-fence exit events and multiple geo-fence enter events for each of the multiple geo-fences, the record of geo-fence events including for each geo-fence event an identification of the geo-fence event and a timestamp of when the geo-fence event was detected; and
   providing, to a program associated with two or more of the multiple geo-fences when the program is scheduled to run during an execution period of the operating system, an indication of a most recent geo-fence exit event and geo-fence enter event for each of the two or more of the multiple geo-fences from the record of geo-fence events responsive to the program running during the execution period of the operating system.

* * * * *